United States Patent
Fujimoto et al.

(10) Patent No.: US 12,459,034 B2
(45) Date of Patent: Nov. 4, 2025

(54) METHOD FOR MANUFACTURING RIVETED JOINT, RIVETED JOINT, AND VEHICLE COMPONENT

(71) Applicant: NIPPON STEEL CORPORATION, Tokyo (JP)

(72) Inventors: Hiroki Fujimoto, Tokyo (JP); Toshiyuki Manabe, Tokyo (JP); Atsushi Ono, Tokyo (JP); Koji Akioka, Tokyo (JP); Takashi Imamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/693,171

(22) PCT Filed: Aug. 16, 2022

(86) PCT No.: PCT/JP2022/030925
§ 371 (c)(1),
(2) Date: Mar. 19, 2024

(87) PCT Pub. No.: WO2023/047840
PCT Pub. Date: Mar. 30, 2023

(65) Prior Publication Data
US 2025/0128315 A1    Apr. 24, 2025

(30) Foreign Application Priority Data
Sep. 27, 2021   (JP) .................................. 2021-156655

(51) Int. Cl.
*B21J 15/08*     (2006.01)
*B23K 11/00*     (2006.01)
(Continued)

(52) U.S. Cl.
CPC ............ *B21J 15/08* (2013.01); *B23K 11/0066* (2013.01); *F16B 5/04* (2013.01); *F16B 5/08* (2013.01)

(58) Field of Classification Search
CPC ........ B21J 15/08; B23K 11/0066; F16B 5/04; F16B 5/045
See application file for complete search history.

(56) References Cited

U.S. PATENT DOCUMENTS 3,561,102 A * 2/1971 Diemer .................... B21J 15/02
                                                               29/524.1
3,848,389 A * 11/1974 Gapp ...................... F16B 19/06
                                                                 16/385

(Continued)

FOREIGN PATENT DOCUMENTS

EP             3318346 A1      5/2018
JP             53-078486 A    7/1978
(Continued)

*Primary Examiner* — Kyle A Cook
(74) *Attorney, Agent, or Firm* — Renner, Otto, Boisselle & Sklar, LLP

(57) ABSTRACT

A method for manufacturing a riveted joint includes: causing a shaft portion of a steel rivet having the shaft portion and a head portion to pass through through-holes of a plurality of overlaid sheet members; sandwiching the rivet between a pair of electrodes in axial direction of the rivet; applying a force to the rivet and energizing the rivet with the electrodes to form a deformed portion at a distal end of the shaft portion; and cooling the rivet. In the rivet after cooling, a Vickers hardness HB of the head portion satisfies 130≤HB≤330, and a Vickers hardness HA of the deformed portion, a thickness TA of the deformed portion, a Vickers hardness HJ of a portion of the shaft portion at center in axial direction and at center in radial direction, diameter DJ of the shaft portion, a Vickers hardness HB of the head portion, and (Continued)

a thickness TB of the head portion satisfy $HJ \times DJ \geq 4.7 \times HB \times TB$ and $HA \times TA \geq 1.3 \times HB \times TB$.

18 Claims, 8 Drawing Sheets

(51) Int. Cl.
 *F16B 5/04* (2006.01)
 *F16B 5/08* (2006.01)

(56) References Cited

U.S. PATENT DOCUMENTS

| | | | | | |
|---|---|---|---|---|---|
| 4,004,484 | A | * | 1/1977 | Speakman | F16B 19/04 411/507 |
| 4,086,839 | A | * | 5/1978 | Briles | B21J 15/02 29/524.1 |
| 4,088,053 | A | * | 5/1978 | Tyree | F16B 19/10 411/501 |
| 4,688,317 | A | * | 8/1987 | Matuschek | F16B 19/06 411/501 |
| 4,858,289 | A | * | 8/1989 | Speller, Sr. | B21J 15/10 29/796 |
| 5,680,690 | A | * | 10/1997 | Briles | B21J 15/02 29/524.1 |
| 2016/0052042 | A1 | * | 2/2016 | Christensen | B21J 15/02 29/407.04 |
| 2017/0066182 | A1 | * | 3/2017 | Trudeau | B29C 70/845 |
| 2021/0162486 | A1 | * | 6/2021 | Trinick | B21J 15/025 |
| 2022/0145921 | A1 | * | 5/2022 | Hornbostel | F16B 19/086 |
| 2023/0076727 | A1 | * | 3/2023 | Whalen | B29C 66/7212 |

FOREIGN PATENT DOCUMENTS

| | | |
|---|---|---|
| JP | 55-027456 A | 2/1980 |
| JP | 61-165247 A | 7/1986 |
| JP | 03-216282 A | 9/1991 |
| JP | 10-205510 A | 8/1998 |
| JP | 2000-202563 A | 7/2000 |
| JP | 2006-507128 A | 3/2006 |
| JP | 2007-254775 A | 10/2007 |
| WO | 2004/048013 A1 | 10/2004 |
| WO | 2021/200692 A1 | 10/2021 |
| WO | 2022/044445 A1 | 3/2022 |

* cited by examiner

METHOD FOR MANUFACTURING RIVETED JOINT, RIVETED JOINT, AND VEHICLE COMPONENT

TECHNICAL FIELD OF THE INVENTION

The present invention relates to a method for manufacturing a riveted joint, a riveted joint, and a vehicle component.

The present application claims priority based on Japanese Patent Application No. 2021-156655 filed in Japan on Sep. 27, 2021, the contents of which are incorporated herein by reference.

RELATED ART

For the purpose of weight reduction of a vehicle and improvement of collision safety, application of a high strength steel sheet has been promoted. However, a spot-welded joint made of a high strength steel sheet has a problem that cross-tension strength (CTS) decreases when tensile strength of a base steel sheet exceeds 780 MPa. When the tensile strength of the steel sheet exceeds 1500 MPa, not only the cross-tension strength but also tensile shear strength (TSS) tends to decrease.

In a case where the strength of the spot-welded joint decreases, a weld may be fractured when a member is deformed due to collision or the like under very severe conditions. Therefore, even when the strength of the steel sheet is improved, a load bearing capacity of the entire member may be insufficient. Therefore, there is a demand for a joining method for improving strength of a joint made of a high strength steel sheet.

As one means for improving cross-tension strength of a joint, the present inventors have focused on rivet joining. The rivet joining is a joining method in which a through-hole is formed in a steel sheet, a rivet having a head portion and a shaft portion is inserted into the through-hole, a distal end of the shaft portion of the rivet is plastically deformed at room temperature to be crushed, and the steel sheet is crimped by the head portion and the plastically deformed portion of the rivet. A joint obtained by the rivet joining is called a riveted joint.

Regarding a method for manufacturing a riveted joint, for example, the following techniques are disclosed.

Patent Document 1 discloses a method for joining two or more constituent members by a fastener, in which each of the constituent members has a hole, the constituent members are disposed such that the holes overlap each other to receive the fastener in the hole, the fastener disposed in the holes is deformed by applying force and heating, and as a result, the constituent members are joined to each other, in which the fastener is heated essentially only in a deformation stage of the fastener to minimize heat transfer from the fastener to the constituent member to be joined, and the joining is performed in such a manner that both the fastener and the constituent members are made of the same or similar alloy contained in a material of an intermetallic alloy group.

Patent Document 2 discloses a method for performing riveting by sandwiching a head portion and a distal end portion of a rivet between a pair of electrodes, electrical heating the rivet, and pressing the rivet, in which a spacer having a small cross-sectional area and a height such that a shaft portion of the rivet is sufficiently closely fitted and filled in a rivet hole, or thereafter, a rear surface of the head portion and a material to be riveted are in contact with each other is disposed between the rear surface of the head portion of the rivet and the material to be riveted.

Patent Document 3 discloses a rivet fastening method for sandwiching a rivet between electrodes, applying current to the rivet, and heating the rivet by resistance heat to perform pressure forming, in which a forming-side head portion electrode is once separated from the rivet after electrical heating such that heating is performed up to a distal end portion of the rivet.

Patent Document 4 discloses a member joining method by electrical crimping of a rivet, in which a rivet hole to be formed by passing through at least two members to be joined is formed at least partially into a tapered hole, a rivet is fitted into the rivet hole, a shaft portion of the rivet is bulged and deformed into a shape along the tapered hole by electrical crimping, and the shaft portion of the rivet and the tapered hole are brought into close contact with each other by thermal contraction of the rivet after the electrical crimping and are joined without a gap. Here, a rivet temperature at the time of the electrical crimping is 700 to 900° C.

Patent Document 5 discloses a rivet fastening method for joining a plurality of workpieces using a rivet, in which a rivet inserted into a plurality of workpieces is energized while the rivet being sandwiched between a pair of electrodes and force being applied thereto, the rivet is softened by resistance heat generation of the rivet itself due to the energization, and an end portion of the rivet is crimped.

Patent Document 6 discloses a non-strain composite joining method in which two annular burring-shaped members to be crimped are overlaid on each other so as to face each other around a hole, the crimped members are subjected to interface joining by resistance spot welding using resistance heat generation, furthermore, a pin is inserted into the hole, and the pin is similarly heated using resistance heat generation and force is applied the pin to perform crimping joining.

Patent Document 7 discloses a method for joining high strength steel sheets having excellent tensile characteristics and fatigue properties, in which a high strength steel sheet having a tensile strength of 430 to 1000 MPa is used as a material to be joined, a rivet is driven into the overlaid sheets of the material to be joined to penetrate the sheets, and a distal end of the rivet penetrating the sheets is deformed to achieve mechanical joining.

CITATION LIST

Patent Document

Patent Document 1

Published Japanese Translation No. 2006-507128 of the PCT International Publication

Patent Document 2

Japanese Unexamined Patent Application, First Publication No. S55-27456

Patent Document 3

Japanese Unexamined Patent Application, First Publication No. S53-78486

Patent Document 4

Japanese Unexamined Patent Application, First Publication No. S61-165247

Patent Document 5

Japanese Unexamined Patent Application, First Publication No. H10-205510

Patent Document 6

Japanese Unexamined Patent Application, First Publication No. H3-216282

Patent Document 7

Japanese Unexamined Patent Application, First Publication No. 2000-202563

SUMMARY OF INVENTION

Problems to be Solved by the Invention

The present inventors have not confirmed an example in which rivet joining is applied to a high strength sheet member (particularly, a high strength metal sheet or steel sheet). In order to manufacture a rivet from a high strength material that is balanced with strength of a high strength sheet member, working costs are required. In addition, when sheet members are joined using a rivet, the number of components increases, and a joint manufacturing costs increase. On the other hand, an advantage of rivet joining of a high strength sheet member has not been known. For the above reasons, a means for joining a high strength sheet member is exclusively welding (particularly spot welding), and there has been no application example of rivet joining. For example, in any of Patent Documents 1 to 8, a material to be joined is a low strength material. In particular, a joining method in which a rivet is driven into a sheet member not having a through-hole and penetrates the sheet member as described in Patent Document 8 cannot be applied to a high strength steel sheet having a tensile strength exceeding 1000 MPa.

However, the present inventors have found that cross-tension strength of a joint in (riveted joint) obtained by rivet joining a high strength steel sheet is significantly higher than that of a spot-welded joint. According to rivet joining that mechanically joins steel sheets, embrittlement of a joint portion does not occur, and thus it is considered that CTS of a joining joint made of a high strength steel sheet can be held high.

On the other hand, the present inventors have found that tensile shear strength of a riveted joint is not necessarily stable, and is inferior to that of the spot-welded joint. It is considered that a reason why the tensile shear strength of a shaft portion of the rivet is low is that hardness of the shaft portion of the rivet is lower than that of a spot weld. In addition, since there is a gap between the rivet and the sheet member, a cross-sectional area of a region to which shear stress is applied in the riveted joint is smaller than that of a spot-welded joint, which is also considered to be a cause of lowering the tensile shear strength.

For example, no means for improving TSS is studied in any of Patent Document 1 to 8. In these documents, a decrease of TSS is not considered as a problem at all, and a mechanism of the decrease of TSS in the riveted joint is not considered. Furthermore, as a result of studies by the present inventors, joint strength (TSS, CTS, or the like) of a riveted joint obtained by applying these techniques to a high strength steel sheet is not sufficient. For example, in a joining method in which a rivet is driven into a sheet member not having a through-hole and penetrates the sheet member as described in Patent Document 8, it is necessary to increase the carbon content, hardenability, and the like of the rivet, thereby high-strengthening the rivet. However, in such a rivet, a hardness distribution after riveting tends to be inappropriate. Therefore, the rivet is easily fractured.

In view of the above circumstances, an object of the present invention is to provide a method for manufacturing a riveted joint capable of obtaining a riveted joint having a stably enhanced tensile shear strength (TSS), and a riveted joint and a vehicle component having a stably enhanced TSS.

Means for Solving the Problem

The gist of the present invention is as follows.

(1) A method for manufacturing a riveted joint according to an aspect of the present invention includes: causing a shaft portion of a steel rivet having the shaft portion and a head portion to pass through through-holes of a plurality of overlaid sheet members; sandwiching the rivet between a pair of electrodes in an axial direction of the rivet; applying a force to the rivet and energizing the rivet with a pair of electrodes to form a deformed portion at a distal end of the shaft portion; and cooling the rivet, in which a Vickers hardness HB (HV) of the head portion of the rivet after cooling satisfies 130≤HB≤330, and in the rivet after cooling, a Vickers hardness HA (HV) of the deformed portion, a thickness TA (mm) of the deformed portion, a Vickers hardness HJ (HV) of a portion of the shaft portion at a center in the axial direction and at a center in a radial direction, a diameter DJ (mm) of the shaft portion, a Vickers hardness HB (HV) of the head portion, and a thickness TB (mm) of the head portion satisfy the following Equations 1 and 2:

$$HJ \times DJ \geq 4.7 \times HB \times TB \qquad \text{Equation 1}$$

$$HA \times TA \geq 1.3 \times HB \times TB. \qquad \text{Equation 2}$$

(2) In the method for manufacturing a riveted joint according to (1), in the rivet after cooling, the Vickers hardness HJ (HV) of the portion of the shaft portion at the center in the axial direction and at the center in the radial direction, the diameter DJ (mm) of the shaft portion, the Vickers hardness HB (HV) of the head portion, and the thickness TB (mm) of the head portion may satisfy the following Equation 3:

$$HJ \times DJ \geq 5.3 \times HB \times TB. \qquad \text{Equation 3}$$

(3) In the method for manufacturing a riveted joint according to (1) or (2), the Vickers hardness HA (HV) of the deformed portion of the rivet after cooling may satisfy 310≤HA≤600, and the Vickers hardness HJ (HV) of the portion of the shaft portion of the rivet after cooling at the center in the axial direction and at the center in the radial direction may satisfy 310≤HJ≤590.

(4) The method for manufacturing a riveted joint according to any one of (1) to (3) may further include projection-welding the head portion of the rivet and the sheet member adjacent to the head portion.

(5) In the method for manufacturing a riveted joint according to (4), in the rivet after cooling, a Vickers hardness HP (HV) of a projection weld formed by the projection welding and the Vickers hardness HB (HV) of the head portion may satisfy the following Equation 4:

$$1.4 \times HB \leq HP \leq 3.2 \times HB. \quad \text{Equation 4}$$

(6) In the method for manufacturing a riveted joint according to any one of (1) to (5), one or more of the plurality of sheet members may be a high strength steel sheet having a tensile strength of 1180 MPa or more.

(7) In the method for manufacturing a riveted joint according to any one of (1) to (6), a C content of the rivet may be 0.08 to 0.40 mass %.

(8) In the method for manufacturing a riveted joint according to any one of (1) to (7), a C content, a Mn content, and a B content of the rivet may satisfy $0.16 \leq C+(1/30) Mn+5B \leq 0.50$.

(9) A riveted joint according to another aspect of the present invention includes: a plurality of overlaid sheet members each having a through-hole; and a steel rivet having a shaft portion, and a head portion and a deformed portion formed at both ends of the shaft portion, respectively, the shaft portion passing through the through-holes and crimping the plurality of sheet members, in which a Vickers hardness HB (HV) of the head portion of the rivet satisfies $130 \leq HB \leq 330$, and a Vickers hardness HA (HV) of the deformed portion of the rivet, a thickness TA (mm) of the deformed portion, a Vickers hardness HJ (HV) of a portion of the shaft portion at a center in an axial direction and at a center in a radial direction, a diameter DJ (mm) of the shaft portion, a Vickers hardness HB (HV) of the head portion, and a thickness TB (mm) of the head portion satisfy the following Equations A and B:

$$HJ \times DJ \geq 4.7 \times HB \times TB \quad \text{Equation A}$$
$$HA \times TA \geq 1.3 \times HB \times TB. \quad \text{Equation B}$$

(10) In the riveted joint according to (9), the Vickers hardness HJ (HV) of the portion of the shaft portion of the rivet at the center in the axial direction and at the center in the radial direction, the diameter DJ (mm) of the shaft portion, the Vickers hardness HB (HV) of the head portion, and the thickness TB (mm) of the head portion may satisfy the following Equation C:

$$HJ \times DJ \geq 5.3 \times HB \times TB. \quad \text{Equation C}$$

(11) In the riveted joint according to (9) or (10), the Vickers hardness HA (HV) of the deformed portion of the rivet may satisfy $310 \leq HA \leq 600$, and the Vickers hardness HJ (HV) of the portion of the shaft portion of the rivet at the center in the axial direction and at the center in the radial direction may satisfy $310 \leq HJ \leq 590$.

(12) The riveted joint according to any one of (9) to (11) may further have a projection weld that joins the head portion of the rivet and the sheet member adjacent to the head portion.

(13) In the riveted joint according to (12), a Vickers hardness HP (HV) of the projection weld and the Vickers hardness HB (HV) of the head portion of the rivet may satisfy the following Equation D:

$$1.4 \times HB \leq HP \leq 3.2 \times HB. \quad \text{Equation D}$$

(14) In the riveted joint according to any one of (9) to (13), one or more of a plurality of the sheet members may be a high strength steel sheet having a tensile strength of 1180 MPa or more.

(15) In the riveted joint according to any one of (9) to (14), the C content of the rivet may be 0.08 to 0.40 mass %.

(16) In the riveted joint according to any one of (9) to (15), a C content, a Mn content, and a B content of the rivet may satisfy $0.16 \leq C+(1/30) Mn+5B \leq 0.50$.

(17) A vehicle component according to another aspect of the present invention includes the riveted joint according to any one of (9) to (16).

(18) The vehicle component according to (17) may be a bumper or a B-pillar.

Effects of the Invention

According to the present invention, it is possible to provide a method for manufacturing a riveted joint capable of obtaining a riveted joint having a stably enhanced tensile shear strength (TSS), and a riveted joint and a vehicle component having a stably enhanced TSS.

EMBODIMENT OF THE INVENTION

Figure 1A:
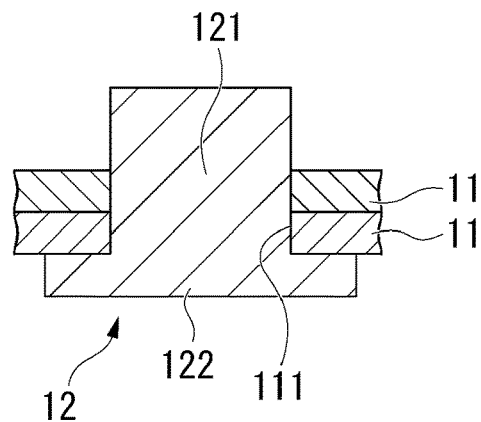
FIG. 1A is a schematic cross-sectional view illustrating a method for manufacturing a riveted joint according to the present embodiment.

The present inventors have intensively conducted studies on a means for obtaining a riveted joint having a stably enhanced tensile shear strength (TSS). As a result, it has been found that there is a correlation between a fracture portion of a rivet and the TSS of the riveted joint. When a shaft portion of the rivet was fractured by tensile shear stress, the TSS of the riveted joint was small. In addition, it has also been found that when the shaft portion of the rivet is fractured by tensile shear stress, a deformation amount of the riveted joint from when the tensile shear stress is applied until the rivet is fractured is small. Furthermore, the present inventors have also found that a value of the TSS is not stable when the deformed portion of the rivet is fractured by tensile shear stress. The present inventors have found that the TSS of the riveted joint can be stably enhanced by controlling the shape and hardness of the rivet such that the rivet is fractured not from the shaft portion or the deformed portion but from the head portion, As illustrated in FIGS. 1A to 1D, a method for manufacturing a riveted joint according to an aspect of the present invention (hereinafter, also abbreviated as a rivet joining method) obtained based on the above findings includes:

(S1) causing a shaft portion 121 of a steel rivet 12 (rivet for electrical heating) having the shaft portion 121 and a head portion 122 to pass through through-holes 111 of a plurality of overlaid sheet members 11;

(S2) sandwiching the rivet 12 between a pair of electrodes A in an axial direction of the rivet 12;

(S3) applying force to the rivet 12 and energizing the rivet 12 with the pair of electrodes A to form a deformed portion 123 at a distal end of the shaft portion 121; and (S4) cooling the rivet 12. Here, the method is performed such that a Vickers hardness HB (HV) of the head portion 122 of the rivet 12 after cooling satisfies 130≤HB≤330. Furthermore, the method is performed such that the shape and hardness of the rivet 12 after cooling satisfy the following Equations 1 and 2.

$$HJ \times DJ \geq 4.7 \times HB \times TB \quad \text{Equation 1}$$

$$HA \times TA \geq 1.3 \times HB \times TB. \quad \text{Equation 2}$$

Figure 1B:
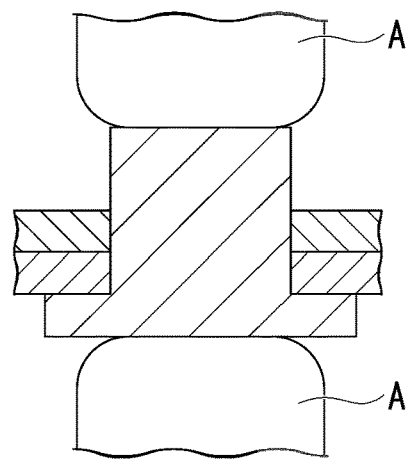
FIG. 1B is a schematic cross-sectional view illustrating the method for manufacturing a riveted joint according to the present embodiment.
Figure 1C:
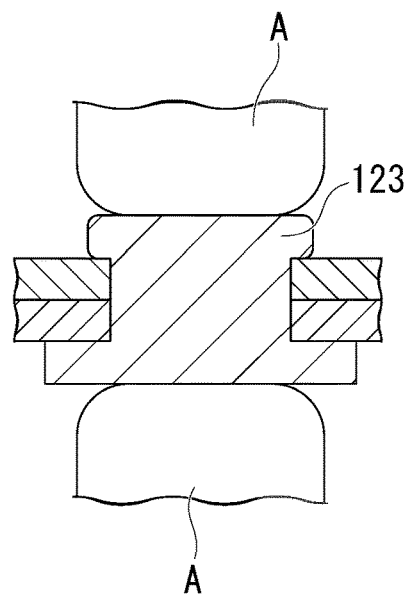
FIG. 1C is a schematic cross-sectional view illustrating the method for manufacturing a riveted joint according to the present embodiment.
Figure 1D:
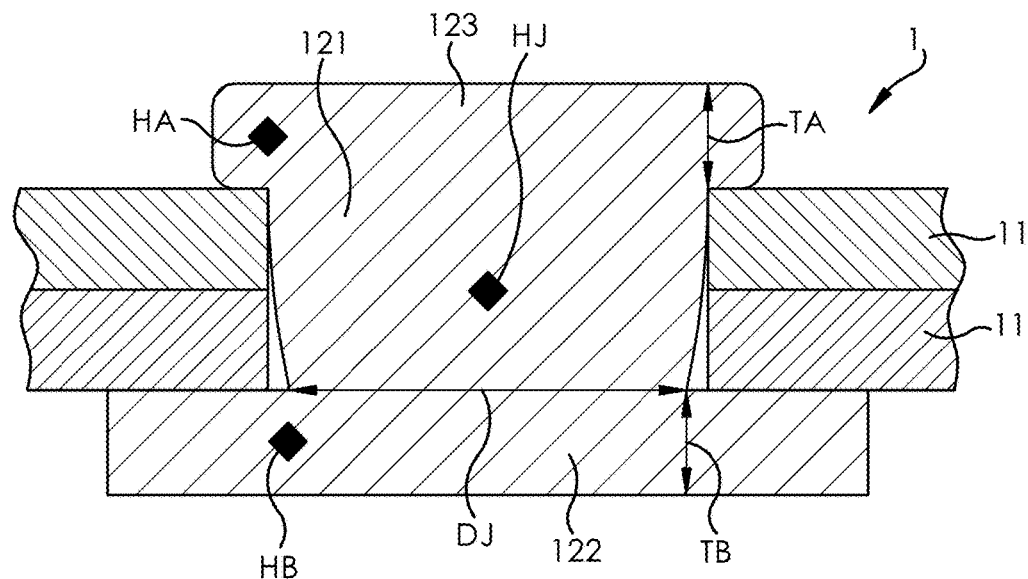
FIG. 1D is a schematic cross-sectional view illustrating the method for manufacturing a riveted joint according to the present embodiment and a riveted joint obtained by the method.

Here, as illustrated in FIG. 1D, the meanings of the reference symbols included in Equations 1 and 2 are as follows.

HA: Vickers hardness of deformed portion 123 of rivet 12 after cooling in unit of HV TA: Thickness of deformed portion 123 of rivet 12 after cooling in unit of mm HJ: Vickers hardness of portion of shaft portion 121 of rivet 12 after cooling at center in axial direction and at center in radial direction in unit of HV DJ: Diameter of shaft portion 121 of rivet 12 after cooling in unit of mm HB: Vickers hardness of head portion 122 of rivet 12 after cooling in unit of HV TB: Thickness of head portion 122 of rivet 12 after cooling in unit of mm Hereinafter, this manufacturing method will be described in detail.

First, as illustrated in FIG. 1A, the shaft portion 121 of the steel rivet 12 is caused to pass through the through-holes 111 of the plurality of overlaid sheet members. Next, as illustrated in FIG. 1B, the rivet 12 is sandwiched between the pair of electrodes A in an axial direction of the rivet 12. The sheet member 11 serves as a base metal of the riveted joint 1. The rivet 12 has the shaft portion 121 and the head portion 122, and a distal end of the shaft portion 121 is plastically deformed by riveting to form the deformed portion 123. The head portion 122 has a function of pinching (crimping) the sheet members 11 together with the deformed portion 123.

A constitution of the sheet member 11 is not particularly limited. For example, when the sheet member 11 is a steel sheet, particularly a high strength steel sheet (for example, a steel sheet having a tensile strength TS of about 590 MPa or more), the strength of the riveted joint 1 can be improved, which is preferable. In addition, the rivet joining method according to the present embodiment does not cause embrittlement that decrease CTS in a high strength steel sheet. Therefore, the rivet joining method according to the present embodiment can provide the riveted joint 1 having a high CTS when applied to joining high strength steel sheets. When the tensile strength of the high strength steel sheet is 980 MPa or more, regarding the CTS, superiority of the rivet joining according to the present embodiment is more remarkable with respect to spot welding. More preferably, as for a strength level of the sheet member 11, the tensile strength is 1180 MPa or more, and optimally 1500 MPa or more. The upper limit of the tensile strength of the sheet member 11 is not particularly limited, but may be, for example, 2700 MPa or less.

The sheet member 11 may be an aluminum sheet, a CFRP sheet, a titanium sheet, or the like. Unlike joining by welding, in the rivet joining according to the present embodiment, different materials may be used for the sheet members 11. For example, a combination of a steel sheet and an aluminum sheet, or a combination of a steel sheet and a CFRP sheet may be used. Arrangement of the sheet members is not particularly limited, but in a case of sheet members made of different materials, it is desirable to arrange a sheet member having a low melting point on a rivet head portion side from a viewpoint of avoiding melting of the sheet member having a low melting point. The sheet member 11 may be subjected to various surface treatments. For example, the sheet member 11 may have GA plating, GI plating, EG plating, Zn—Al plating, Zn—Mg plating, Zn—Ni plating, Zn—Al—Mg plating, Al plating, and Zn-based plating (Zn—Fe or Zn—Ni—Fe) and Al-based plating (Al—Fe—Si) alloyed with a base metal by hot stamping.

The sheet thickness of the sheet member 11 is not particularly limited, and may be, for example, 0.5 mm to 3.6 mm. The thicknesses of the sheet members 11 may be different from each other. The number of the sheet members 11 is not particularly limited. In the description of the rivet joining according to the present embodiment, the number of the sheet members 11 is assumed to be two, but the number of the sheet members 11 may be three or more. Examples of a preferable combination include a two-ply product including a sheet member having a sheet thickness of about 1.6 mm and a sheet member having a sheet thickness of about 2.3 mm, and a three-ply product including a sheet member having a sheet thickness of 0.75 mm, a sheet member having a sheet thickness of 1.8 mm, and a sheet member having a sheet thickness of 1.2 mm. Examples of a preferable range of a combination of the sheet members include a two-ply product including a sheet member having a sheet thickness of about 0.6 mm to 2.9 mm and a sheet member having a sheet thickness of 0.6 mm to 2.9 mm, and a three-ply product including a sheet member having a sheet thickness of 0.6 mm to 1.6 mm, a sheet member having a sheet thickness of 0.6 mm to 2.9 mm, and a sheet member having a sheet thickness of 0.6 mm to 2.9 mm. The sheet member may be a formed article formed by cold or hot press forming, cold roll forming, or hydroform forming. The sheet member may be formed in a pipe shape.

The constitution of the through-hole 111 into which the rivet 12 is inserted is not particularly limited. The diameter of the through-hole 111 is preferably larger than the diameter of the shaft portion of the rivet 12 before riveting from a viewpoint of causing the rivet 12 to smoothly pass through the through-hole 111.

The shape of the through-hole 111 can be, for example, a circle. On the other hand, the shape of the through-hole 111 may be a polygonal shape such as a quadrangle, a pentagon, a hexagon, or an octagon. Corner portions of these polygonal shapes may have curvatures. In addition, the shape of the through-hole 111 may be an ellipse or a shape having a protrusion or a recessed part in a part of a circle. By forming the through-hole 111 into a shape other than a circle, it is possible to prevent the rivet-joined sheet members from rotating about the rivet in the through-hole and to reduce rattling of a joint portion, which is more desirable.

The through-hole 111 through which the rivet 12 passes can be formed by any means such as laser cutting, punching using a die, or drilling using a drill. When the sheet member 11 is a hot-stamped steel sheet, it is desirable to form the through-hole 111 by hot die punching or laser cutting.

The size of the through-hole 111 may be constant in a depth direction of the sheet member 11. On the other hand, a stepped shape or a tapered shape in which the size of the through-hole 111 changes in the depth direction may be applied to the through-hole 111. Central axes of the through-holes 111 of a plurality of members of a material to be joined do not have to coincide with each other.

Figure 3:
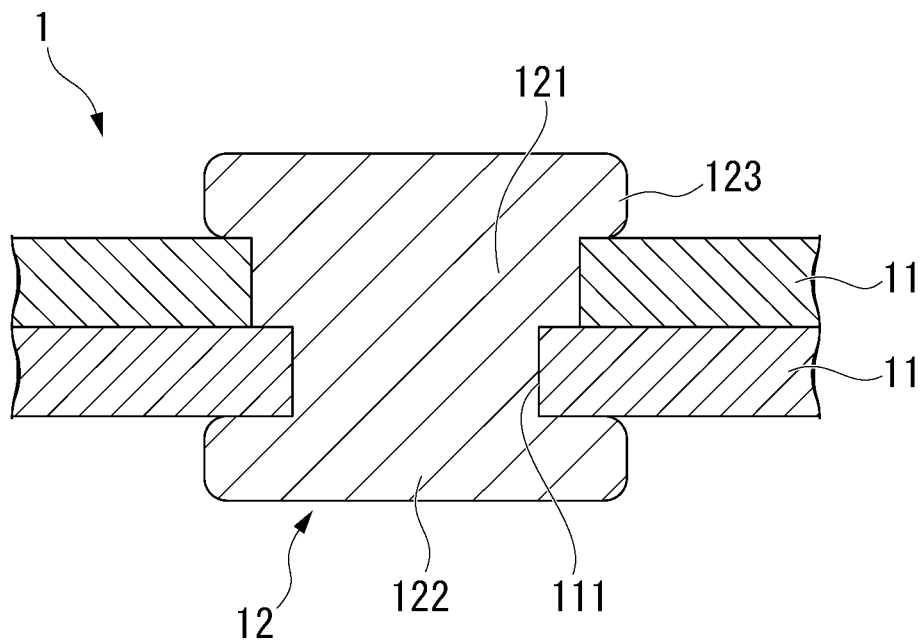
FIG. 3 is a cross-sectional view illustrating an example of a riveted joint in which sheet members have different sizes of through-holes.

The diameters of the through-holes 111 (equivalent circle diameters when the through-holes 111 are not circular) in the plurality of sheet members 11 may be the same as illustrated in FIG. 1B, or may be different as illustrated in FIG. 3. By providing a difference between the sizes of the through-holes 111, a stress relaxation effect and improvement in efficiency of work of causing the rivet 12 to pass through the through-holes 111 can be expected. The degree of difference between the diameters of the through-holes 111 is not particularly limited, but for example, the difference between the diameters of the through-holes 111 in the adjacent sheet members 11 is preferably in a range of 0.3 mm to 3 mm. It is preferable to increase the diameter of a through-hole of a sheet member on a side opposite to a side serving as an inlet of the rivet (a side on which the head portion of the rivet is located) from a viewpoint of facilitating the work of causing the rivet 12 to pass through the through-holes 111. This can prevent a distal end of the rivet 12 from being clogged in the through-hole 111.

In addition, a minimum value of the diameter of the through-hole 111 is desirably larger than an absolute maximum value of the diameter of the shaft portion of the rivet to be inserted by 0.1 mm to 5 mm. This is because when the difference is smaller than 0.1 mm, insertability is deteriorated, and when the difference is larger than 5 mm, it is difficult to sufficiently fill a gap of the through-hole 111. The difference is more desirably in a range of 0.3 mm to 3 mm, and optimally in a range of 0.5 mm to 2.3 mm. A deviation between central axes of the through-holes 111 of the plurality of members of a material to be joined is desirably 1.5 mm or less, and more desirably 0.75 mm or less.

The rivet 12 is made of steel. Thus, the joining strength of the riveted joint 1 can be excellent. Other constitutions of the rivet 12 are not particularly limited before riveting. A preferable constitution can be appropriately selected such that the shape and hardness of the rivet 12 after riveting described later satisfy a predetermined relational Equation. A preferable example of the constitution of the rivet 12 will be described later.

Next, as illustrated in FIG. 1C, the rivet 12 is sandwiched between the pair of electrodes A in an axial direction of the rivet 12. Then, force is applied to the rivet 12 and the rivet 12 is energized via the pair of electrodes A. As a result, resistance heat generation is caused in the rivet 12, the rivet 12 is softened, and a distal end of the shaft portion 121 of the rivet 12 is crushed (so-called riveting). As a result, the deformed portion 123 is formed at the distal end of the shaft portion 121.

In the rivet joining according to the present embodiment, the rivet 12 is preferably energized after the force is applied to the rivet 12 using the electrodes A. When energization is started in a state in which the force is applied, softening of the shaft portion 121 and deformation of the distal end of the shaft portion 121 occur. At this time, a melted portion may be generated inside the rivet 12. In this case, joining is performed by a procedure of sandwiching the rivet 12 between the electrodes A, applying the force to the rivet 12, energizing the rivet 12, and cooling the rivet 12. However, a timing to start heating the rivet 12 and a timing to start applying force to the rivet 12 are not limited to the above preferable examples.

In normal rivet joining, the rivet 12 is allowed to be heated and softened before the shaft portion 121 of the rivet 12 is inserted into the through-hole 111 of the sheet member 11. Also in the method for manufacturing a riveted joint according to the present embodiment, the rivet 12 may be heated, and then the shaft portion 121 of the rivet 12 may be inserted into the through-hole of the sheet member 11. After the insertion, the pair of electrodes A is energized to generate resistance heat in the rivet 12, the rivet 12 is softened, a distal end of the shaft portion of the rivet is deformed, and the rivet is cooled. For example, in a case where the diameter of the shaft portion of the rivet is large or the rivet is hard before insertion, it may be preferable to soften the rivet before insertion.

The rivet 12 is cooled following force-applying and energization. As a result, quenching hardening occurs in the steel rivet 12 after cooling illustrated in FIG. 1D, In the rivet 12 after cooling, the shape and hardness of the rivet 12 need to satisfy the following Equations 1 and 2.

$$HJ \times DJ \geq 4.7 \times HB \times TB \qquad \text{Equation 1}$$

$$HA \times TA \geq 1.3 \times HB \times TB. \qquad \text{Equation 2}$$

In the rivet 12 after cooling, HB included in the above Equations 1 and 2 needs to satisfy 130≤HB≤330.

The symbol "HA" indicates the Vickers hardness of the deformed portion 123 of the rivet 12 after cooling in unit of HV Hereinafter, this value HA is referred to as "Vickers hardness of the deformed portion 123". The Vickers hardness of the deformed portion 123 is measured at a cut surface of the riveted joint 1 passing through an axis of the rivet 12 after cooling. In this cut surface, a surface of the sheet member 11 in contact with the deformed portion 123 is regarded as a boundary between the deformed portion 123 and the shaft portion 121. A center portion of the deformed portion 123 in a thickness direction at each end of the shaft portion 121 is used as a measurement position of the Vickers hardness HA of the deformed portion 123. Note that the thickness direction of the deformed portion 123 is equal to the axial direction of the rivet 12. For example, in FIG. 1D, a point denoted by a reference symbol "HA" is a measurement position of the Vickers hardness HA of the deformed portion 123. The Vickers hardness HA of the deformed portion 123 is obtained by measuring the Vickers hardness under a load of 0.5 kgf at this measurement position.

The symbol "TA" indicates the thickness of the deformed portion 123 of the rivet 12 after cooling in unit of mm. Hereinafter, this value TA is referred to as "thickness of the deformed portion 123". The thickness of the deformed portion 123 is obtained by measuring the thickness of the deformed portion 123 at each end of the shaft portion 121 in the axial direction of the rivet 12 in the cut surface of the riveted joint 1 passing through an axis of the rivet 12 after cooling. For example, in FIG. 1D, an arrow denoted by the reference symbol "TA" is a measurement position of the thickness TA of the deformed portion 123.

Figure 2A:
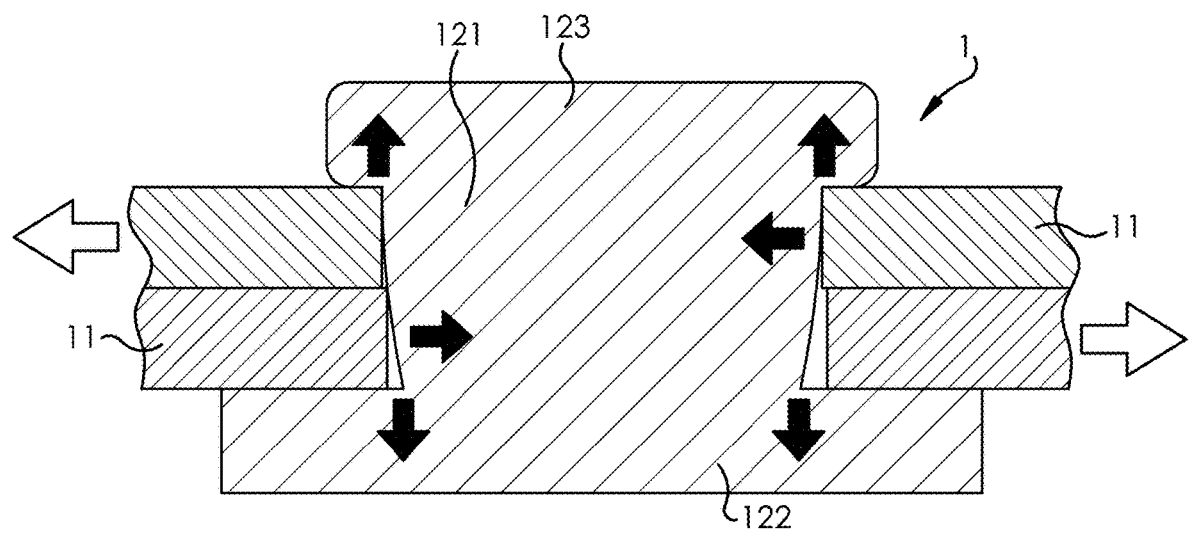
FIG. 2A is a schematic diagram of a stress distribution when tensile shear stress is applied to a riveted joint.

FIG. 2A illustrates a schematic diagram of a stress distribution when tensile shear stress is applied to the riveted joint 1. In FIG. 2A, a white arrow indicates a direction of tensile shear stress applied to the sheet member 11, and a black arrow indicates the position and direction of stress applied to the rivet 12 by the sheet member 11. As illustrated in FIG. 2A, the measurement portions of the Vickers hardness HA and the thickness TA of the deformed portion 123 described above are portions where stress for pulling out the rivet 12 from the through-hole 111 in a direction from the deformed portion 123 toward the head portion 122 is maximized in the deformed portion 123 when the stress is applied to the deformed portion 123. Therefore, in controlling a fracture mode of the rivet 12, it is most appropriate to use the hardness and thickness of the deformed portion 123 obtained at the measurement portions described above.

The symbol "HJ" indicates the Vickers hardness of a portion of the shaft portion 121 of the rivet 12 after cooling at a center in an axial direction and at a center in a radial direction in unit of HV Hereinafter, this value HJ is referred to as "Vickers hardness of the shaft portion 121". The Vickers hardness of the shaft portion 121 is measured at a cut surface of the riveted joint 1 passing through an axis of the rivet 12 after cooling. In this cut surface, a surface of the sheet member 11 in contact with the shaft portion 121 is regarded as a boundary between the shaft portion 121 and the deformed portion 123, and a surface of the sheet member 11 in contact with the head portion 122 is regarded as a boundary between the shaft portion 121 and the head portion 122. A position on a central axis of the shaft portion 121 and at a center portion of the above-described two boundaries is used as a measurement position of the Vickers hardness HJ of the shaft portion 121. For example, in FIG. 1D, a point denoted by the reference symbol "HJ" is a measurement position of the Vickers hardness HJ of the shaft portion 121. The Vickers hardness HJ of the shaft portion 121 is obtained by measuring the Vickers hardness under a load of 0.5 kgf at this measurement position. Note that when a defect such as a crack or a blow hole is present at the Vickers hardness measurement position, the Vickers hardness is measured at a position in the vicinity 0.2 mm or more away from the defect.

The symbol "DJ" indicates the diameter of the shaft portion 121 of the rivet 12 after cooling in unit of mm Hereinafter, this value DJ is referred to as "diameter of the shaft portion 121". When the shaft portion 121 after cooling has a cylindrical shape, the diameter of the shaft portion 121 is a minimum value of the width of the shaft portion 121 measured in a direction perpendicular to the axial direction in a cut surface of the riveted joint 1 passing through an axis of the rivet 12 after cooling.

For example, in FIG. 1D, an arrow denoted by the reference symbol "DJ" is a measurement position of the diameter DJ of the shaft portion 121. When the diameter of the through-hole 111 and the diameter of the shaft portion 121 before riveting are constant in the axial direction, the diameter of the shaft portion 121 after riveting is larger as it is closer to the deformed portion 123. This is because, by the riveting, the shaft portion 121 largely expands so as to fill a gap between the shaft portion 121 and the through-hole 111 at a position close to the deformed portion 123, and on the other hand, the shaft portion 121 does not expand so much at a position close to the head portion 122. Therefore, in FIG. 1D, a boundary between the head portion 122 and the shaft portion 121 is a measurement position of the diameter DJ of the shaft portion 121. Note that when the through-hole 111 has a taper or when the diameters of the through-holes 111 formed in the plurality of sheet members 11 are different from each other, there is a possibility that the position where the width of the shaft portion 121 is minimized does not coincide with the boundary between the head portion 122 and the shaft portion 121.

When the shaft portion 121 after cooling does not have a cylindrical shape, the diameter of the shaft portion 121 cannot be measured in a cut surface passing through an axis of the rivet 12. In this case, first, a position where the diameter of the shaft portion 121 is minimized is identified by observing the cut surface passing through the axis of the rivet 12. Next, the shaft portion 121 is cut perpendicularly to the axis of the rivet 12 at a position where the diameter of the shaft portion 121 is minimized. An equivalent circle diameter of a cut surface perpendicular to the axis of the rivet 12 is regarded as the diameter DJ of the shaft portion 121.

The measurement position of the Vickers hardness HJ of the shaft portion 121 described above is a position representing the Vickers hardness of the shaft portion 121. In addition, the measurement position of the diameter DJ of the shaft portion 121 described above is a position where fracture most easily occurs in the shaft portion 121. Therefore, in controlling a fracture mode of the rivet 12, it is most appropriate to use the hardness and diameter of the shaft portion 121 obtained at the measurement portions described above.

The symbol "HB" indicates the Vickers hardness of the head portion 122 of the rivet 12 after cooling in unit of HV. Hereinafter, this value HB is referred to as "Vickers hardness of the head portion 122". The Vickers hardness of the head portion 122 is measured at a cut surface of the riveted joint 1 passing through an axis of the rivet 12 after cooling. In this cut surface, a surface of the sheet member 11 in contact with the head portion 122 is regarded as a boundary between the head portion 122 and the shaft portion 121. A center portion of the head portion 122 in a thickness direction at each end of the shaft portion 121 is used as a measurement position of the Vickers hardness HB of the head portion 122. Note that the thickness direction of the head portion 122 is equal to the axial direction of the rivet 12. For example, in FIG. 1D, a point denoted by a reference symbol "HB" is a measurement position of the Vickers hardness HB of the head portion 122. The Vickers hardness HB of the head portion 122 is obtained by measuring the Vickers hardness under a load of 0.5 kgf at this measurement position.

The symbol "TB" indicates the thickness of the head portion 122 of the rivet 12 after cooling in unit of mm. Hereinafter, this value TB is referred to as "thickness of the head portion 122". The thickness of the head portion 122 is obtained by measuring the thickness of the head portion 122 at each end of the shaft portion 121 in the axial direction of the rivet 12 in the cut surface of the riveted joint 1 passing through an axis of the rivet 12 after cooling. For example, in FIG. 1D, an arrow denoted by the reference symbol "TB" is a measurement position of the thickness TB of the head portion 122.

As illustrated in FIG. 2A, the measurement portions of the Vickers hardness HB and the thickness TB of the head portion 122 described above are portions where stress for pulling out the rivet 12 from the through-hole 111 in a direction from the head portion 122 toward the deformed portion 123 is maximized in the head portion 122 when the stress is applied to the head portion 122. Therefore, in controlling a fracture mode of the rivet 12, it is most appropriate to use the hardness and thickness of the head portion 122 obtained at the measurement portions described above.

In the rivet 12 after cooling, it is necessary to control the shapes and the hardness of the shaft portion 121, the head portion 122, and the deformed portion 123 such that Equations 1 and 2 are satisfied.

$$HJ \times DJ \geq 4.7 \times HB \times TB \qquad \text{Equation 1}$$

$$HA \times TA \geq 1.3 \times HB \times TB. \qquad \text{Equation 2}$$

Both Equations 1 and 2 are definitions provided in order to prevent fracture in the shaft portion 121 and to promote fracture in the head portion 122. Specifically, Equation 1 defines that the Vickers hardness HB and the thickness TB of the head portion 122 are made sufficiently smaller than the Vickers hardness HJ and the diameter DJ of the shaft portion 121. In addition, Equation 2 defines that the Vickers hardness HB and the thickness TB of the head portion 122 are made sufficiently smaller than the Vickers hardness HA and the thickness TA of the deformed portion 123. As a result, fracture preferentially occurs at the head portion 122.

The lower limit value of HJ×DJ may be 5.3×HB×TB. That is, in the rivet 12 after cooling, the Vickers hardness HJ (HV) of a portion of the shaft portion 121 at a center in an axial direction and at a center in a radial direction, the diameter DJ (mm) of the shaft portion 121, the Vickers hardness HB (HV) of the head portion 122, and the thickness TB (mm) of the head portion 122 may satisfy the following Equation 3:

$$HJ \times DJ \geq 5.3 \times HB \times TB. \qquad \text{Equation 3}$$

When the above Equation 3 is satisfied, fracture in the shaft portion 121 is further suppressed. The lower limit value of HJ×DJ may be 5.0×HB×TB, 5.5×HB×TB, or 5.8× HB×TB.

The lower limit value of HA×TA may be 1.5×HB×TB. As a result, fracture in the shaft portion 121 is further suppressed. The lower limit value of HA×TA may be 1.8×HB× TB, 2.0×HB×TB, or 2.5×HB×TB.

A reason why fracture should occur in the head portion 122 will be described below. The present inventors have intensively conducted studies on a means for obtaining a riveted joint having a stably enhanced tensile shear strength (TSS). As a result, it has been found that there is a correlation between a fracture portion of the rivet 12 and the TSS of the riveted joint 1. When the shaft portion 121 of the rivet 12 was fractured by tensile shear stress, the TSS of the riveted joint 1 was small. In addition, it has also been found that when the shaft portion 121 of the rivet 12 is fractured by tensile shear stress, a deformation amount of the riveted joint 1 from when the tensile shear stress is applied until the rivet 12 is fractured is small. Furthermore, the present inventors have also found that a value of the TSS is not stable when the deformed portion 123 of the rivet 12 is fractured by tensile shear stress. The present inventors have found that the TSS of the riveted joint 1 can be stably enhanced by controlling the shape and hardness of the rivet 12 such that the rivet 12 is fractured not from the shaft portion 121 or the deformed portion 123 but from the head portion 122.

FIGS. 2A to 2D illustrate schematic cross-sectional views of the riveted joint 1 when tensile shear stress is applied. In FIGS. 2A to 2D, the upper sheet member 11 is pulled to the left side, and the lower sheet member 11 is pulled to the right side. As a result, a stress toward the left side is applied to an upper portion of the shaft portion 121 by an inner wall of the upper through-hole 111, and a stress toward the right side is applied to a lower portion of the shaft portion 121 by an inner wall of the lower through-hole 111. In addition, a downward stress is applied to the head portion 122 by an outer periphery of the lower through-hole 111, and an upward stress is applied to the deformed portion 123 by an outer periphery of the upper through-hole 111. This is because a stress for pulling out the rivet 12 from the through-hole 111 is applied to the head portion 122 and the deformed portion 123.

Figure 2B:
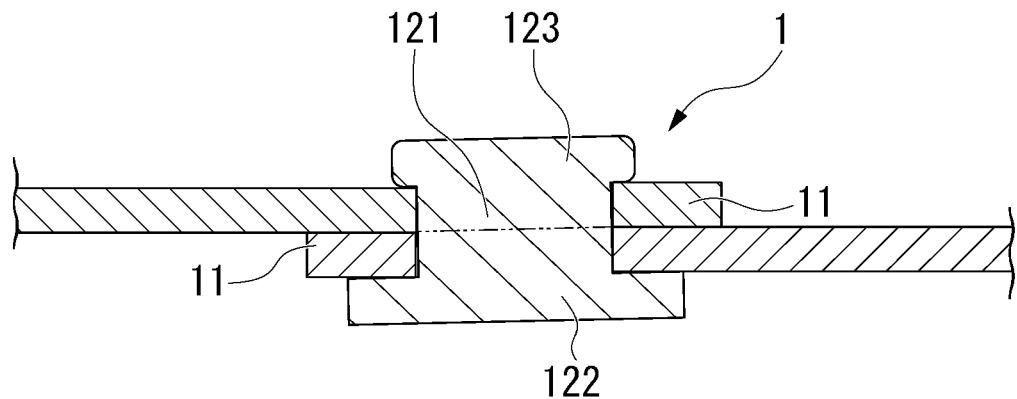
FIG. 2B is a schematic cross-sectional view of a riveted joint when a shaft portion is fractured by tensile shear stress.
Figure 2C:
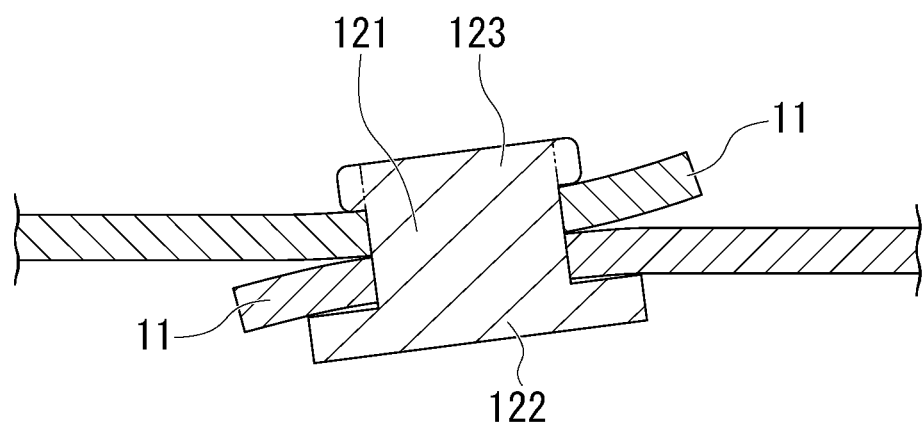
FIG. 2C is a schematic cross-sectional view of a riveted joint when a deformed portion is fractured by tensile shear stress.
Figure 2D:
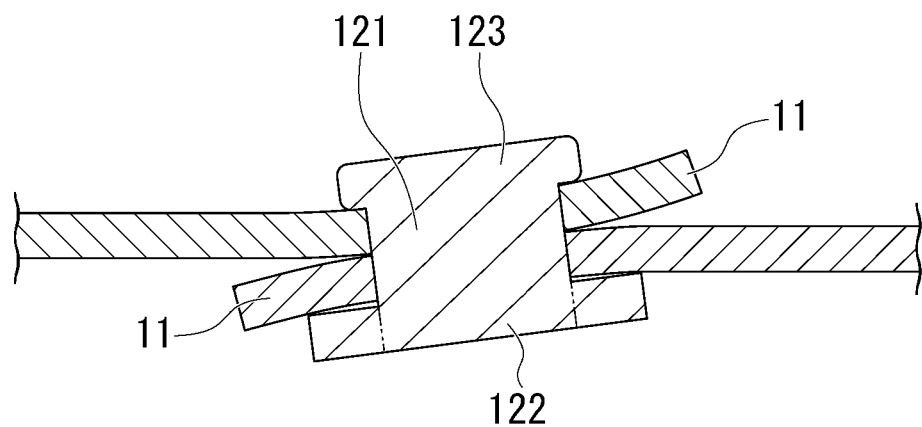
FIG. 2D is a schematic cross-sectional view of a riveted joint when a head portion is fractured by tensile shear stress.

FIG. 2B is a schematic view of the riveted joint 1 when the shaft portion 121 serves as a fracture starting point. FIGS. 2C and 2D are schematic views of the riveted joint 1 when the deformed portion 123 and the head portion 122 serve as fracture starting points, respectively. According to experimental results of the present inventors, when the shaft portion 121 served as a fracture starting point, as illustrated in FIG. 2B, deformation of the sheet member 11 did not occur much until fracture, and thus a deformation amount from start of application of shear stress to fracture was small. On the other hand, when the deformed portion 123 or the head portion 122 served as a fracture starting point, as illustrated in FIGS. 2C and 2D, the sheet member 11 was deformed before fracture, and the rivet 12 was inclined, whereby a deformation amount from start of application of shear stress to fracture was large. The TSS when the deformed portion 123 or the head portion 122 served as a fracture starting point was larger than the TSS when the shaft portion 121 served as a fracture starting point.

Note that when fracture occurred in the deformed portion 123, the TSS varied. In the deformed portion 123 formed at the time of riveting, the shape is not constant, and the hardness is not uniform because the deformed portion 123 has undergone large plastic deformation. This may be a cause of TSS variation when fracture occurs in the deformed portion 123. The present inventors have studied to eliminate the TSS variation by increasing the size of the deformed portion 123, but in this case, cracking occurred in the deformed portion 123 at the time of riveting. On the other hand, when fracture occurred in the head portion 122, the TSS was stably a high value.

According to the experimental results of the present inventors, it has been confirmed that the head portion 122 is most likely to be fractured in the rivet 12 after cooling by controlling the shapes and hardness of the shaft portion 121, the head portion 122, and the deformed portion 123 so as to satisfy Equations 1 and 2. Therefore, in the method for manufacturing the riveted joint 1 according to the present embodiment, it is necessary to perform riveting and cooling such that Equations 1 and 2 are satisfied.

In the rivet 12 after cooling, the Vickers hardness HB of the head portion 122 needs to satisfy 130≤HB≤330. When the Vickers hardness HB of the head portion 122 is more than 330, a fracture starting point of the rivet 12 may be outside the head portion 122. On the other hand, when the Vickers hardness HB of the head portion 122 is less than 130, the TSS of the riveted joint 1 rather decreases. For the above reasons, the Vickers hardness HB of the head portion 122 is 130 or more and 330 or less. The Vickers hardness HB of the head portion 122 may be 135 or more, 150 or more, or 180 or more. The Vickers hardness HB of the head portion 122 may be 300 or less, 280 or less, or 250 or less.

Energization conditions are not particularly limited as long as riveting and quenching of the rivet 12 are performed so as to satisfy the above requirements. The shape and hardness of the rivet 12 after cooling can be controlled through a chemical composition of the rivet 12, the strength of the rivet 12, the dimensions of the rivet 12, force-applying conditions and energization conditions when the force is applied to the rivet 12 and the rivet 12 is energized, and cooling conditions of the rivet 12. Preferable examples of these conditions are as follows.

First, an example of the chemical composition of the rivet 12 will be described. As the chemical composition of the rivet 12, for example, it is only required to use chemical components in which the C content, the Mn content, and the B content in unit mass % satisfy 0.16≤C+(1/30) Mn+5B≤0.50 or less. By setting C+(1/30) Mn+5B to 0.16 or more, the hardness of the rivet 12 can be ensured. On the other hand, by setting C+(1/30) Mn+5B to 0.50 or less, the toughness of the rivet 12 can be ensured. The C+(1/30) Mn+5B may be 0.18 or more, 0.20 or more, or 0.25 or more. The C+(1/30) Mn+5B may be 0.48 or less, 0.45 or less, or 0.35 or less.

The carbon content of the rivet 12 may be 0.08 to 0.40 mass %. As a result, a quenched portion is formed in the rivet 12, and the joining strength of the riveted joint 1 can be further enhanced. The carbon content of the rivet 12 may be 0.10 mass % or more, 0.15 mass % or more, or 0.17 mass % or more. The carbon content of the rivet 12 may be 0.350 mass % or less, 0.30 mass % or less, or 0.25 mass % or less.

Next, an example of the shape of the rivet 12 before riveting will be described. Hereinafter, unless otherwise specified, description of an example of the shape of the rivet 12 relates to the rivet 12 before the deformed portion 123 is formed by applying force and energizing.

The diameter of the shaft portion 121 (equivalent circle diameter of the shaft portion 121 when a cross section of the shaft portion 121 is not circular) of the rivet 12 before riveting may be 3 mm or more from a viewpoint of ensuring joint strength. When the diameter of the shaft portion 121 is too large, a current density decreases, and the rivet is hardly softened. Therefore, an upper limit of the diameter of the shaft portion 121 may be 12 mm or less. The length of the shaft portion 121 (a value obtained by subtracting the thickness of head portion 122 from the length of the rivet 12) needs to be larger than the total sheet thickness of the sheet members 11, and is preferably in the following range when the rivet 12 has the head portion 122. Note that values included in the following Equations are those before riveting.

$$\text{Total sheet thickness of sheet members} +$$
$$\text{diameter of shaft portion} \times 0.3 \leq \text{length of shaft portion} \leq$$
$$\text{total sheet thickness of sheet members} + \text{diameter of shaft portion} \times 2.0$$

By setting the length of the shaft portion 121 of the rivet 12 to be larger than the total sheet thickness of the sheet members 11+the diameter of the shaft portion 121×0.3, the size of the crimped portion (deformed portion 123) after a distal end of the shaft portion 121 is deformed can be ensured, and the joint strength can be further enhanced. By setting the length of the shaft portion 121 to be equal to or less than the total sheet thickness of the sheet members 11+the diameter of the shaft portion 121×2.0, manufacturing efficiency can be enhanced.

Note that the diameter of the shaft portion 121 may be constant. On the other hand, the rivet 12 may have a shape in which the diameter of the shaft portion 121 decreases toward the distal end of the shaft portion 121 (so-called tapered shape). The taper portion may be formed over the entire shaft portion 121 or may be formed only in the vicinity of the distal end of the shaft portion 121. The rivet 12 having a tapered shape is preferable because of being easily inserted into the through-hole 111. The distal end of the shaft portion 121 may be flat or hemispherical. A hemispherical distal end of the shaft portion 121 is preferable because the shaft portion 121 can be easily inserted into the through-hole 111.

The head portion 122 of the rivet 12 may have a general flange shape. For example, the shape of the head portion 122 can be a hemispherical shape (a so-called round head), a disk shape (a so-called flat head), or a shape in which a surface side is flat and a base is conical (a so-called dish head). The shape of the head portion 122 in plane view can be, for example, a circle or a polygonal shape such as a quadrangle or a hexagon. A recessed part for positioning may be formed at a center portion of the head portion 122 on the electrode side. A recessed part (a so-called seat undercut) surrounding the shaft portion 121 may be formed in a seat portion (surface in contact with a material to be joined) of the head portion 122. Such a recessed part imparts elasticity to the head portion 122, thereby further increasing a crimping force of the rivet 12. One or more projection portions may be formed on the seat portion (surface in contact with a material to be joined) of the head portion 122. Such a projection portion is stuck in a material to be joined during riveting or forms a joint portion with a material to be joined, thereby further increasing a crimping force of the rivet 12. Examples of the shape of the projection portion include a circular shape, a polygonal shape, and a ring shape surrounding the shaft portion. Note that a cross-sectional shape of the head portion 122 of the rivet 12 after riveting and cooling illustrated in FIG. 1D and the like is a quadrangle. However, even when the cross-sectional shape of the head portion 122 is a shape other than the quadrangle, for example, is a hemispherical shape, the Vickers hardness HB of the head portion 122 and the thickness TB of the head portion 122 may be measured by the method described above.

The rivet 12 crimps the sheet member 11 using the head portion 122 thereof. Therefore, the diameter of the head portion 122 is preferably larger than the diameter of the through-hole 111 by 1.5 mm or more. The diameter of the head portion 122 is more desirably larger than the diameter of the through-hole 111 by 3.0 mm or more. The thickness of the head portion 122 is preferably 0.8 mm to 5 mm. When the thickness of the head portion 122 is less than 0.8 mm, joint strength cannot be sufficiently obtained. On the other hand, when the thickness of the head portion 122 is more than 5 mm, there is a possibility that a starting point of fracture is outside the head portion 122.

For example, the rivet 12 may be manufactured by cutting a coil wire rod and subjecting the coil wire rod to cutting or cold forging. A method for processing the cut coil is desirably cold forging from a viewpoint of productivity. The processed rivet 12 may be used as it is, but when joint strength is particularly required, the rivet after cutting or cold forging may be subjected to heat treatment of quenching and tempering. By increasing the hardness of the entire rivet 12 including the head portion 122 of the rivet 12 by this heat treatment, the joint strength is further improved.

The rivet 12 may be a rivet that has not been subjected to surface treatment, but may be subjected to surface treatment when corrosion resistance is required. For example, the rivet 12 may be subjected to zinc-based plating, aluminum-based plating, chromium-based plating, nickel-based plating, chromate treatment, or the like.

Next, an example of conditions for applying force to the rivet 12 and energizing the rivet 12 will be described. The rivet 12 is preferably energized to such an extent that quenching hardening occurs. Note that a temperature required for quenching varies depending on components (for example, the carbon content and a carbon equivalent) of the rivet 12. Therefore, a heating temperature may be appropriately selected according to components of the rivet 12. For example, a maximum attainment temperature of the shaft portion 121 of the rivet 12 is preferably higher than 900° C. Note that when a point $A_3$ of the rivet 12 is low, the maximum attainment temperature of the shaft portion 121 may be lower than 900° C. Quenching is not essential for the head portion 122 of the rivet, and therefore a maximum attainment temperature of the head portion 122 may be 900° C. or higher or lower than 900° C. Note that the maximum attainment temperature of the shaft portion 121 of the rivet 12 can be estimated by observing a metallographic structure of a cross section of the shaft portion 121 of the rivet 12. For example, when a material of the rivet 12 is an iron alloy and a martensite microstructure is generated in the shaft portion, it can be estimated that the maximum attainment temperature of the shaft portion of the rivet 12 is about 900° C. or higher. In addition, when the material of the rivet 12 is an iron alloy and a melted and solidified portion is generated in the shaft portion 121, it can be estimated that the maximum attainment temperature of the shaft portion 121 of the rivet 12 is 1530° C. or higher.

After the sheet members 11 are overlaid on each other, the rivet 12 is inserted into the through-hole 111 by, for example, a rivet supply device. Then, the rivet is energized and heated while applying force to the rivet using, for example, a spot-welding machine. Alternatively, after the sheet members 11 are overlaid on each other, the rivet 12 is disposed on an electrode A of a spot-welding robot having a mechanism for holding the head portion 122 of the rivet, for example, by a rivet supply device. Then, the spot-welding robot moves, whereby the rivet 12 on the electrode A is inserted into the through-hole 111. Then, the rivet is energized and heated while applying the force to the rivet. Specific energization conditions (current value, voltage value, energization time, and the like) for heating the rivet 12 to a temperature necessary for quenching and conditions for applying the force to the rivet 12 are not particularly limited, and can be appropriately selected according to the shape and material of the rivet 12. A person skilled in the art can study optimum conditions for applying force and energizing according to the shape and material of the rivet 12 by applying the force to the rivet 12 and energizing the rivet 12 under various conditions.

It is preferable that the force is applied to the rivet 12 and the rivet 12 is energized using a pair of electrodes A. A constitution of the pair of electrodes A is not particularly limited. For example, since an electrode for spot welding can perform applying force and energizing, the rivet joining according to the present embodiment may be performed using the electrode for spot welding. The shape of the electrode A can be appropriately selected according to the shape of the rivet 12. For example, the electrode A may be a flat electrode, a single R type, a CF type, or a DR type. Examples of a material of the electrode A include chromium copper, alumina-dispersed copper, and chromium zirconium copper, having excellent conductivity. Note that one side of the pair of electrodes A desirably has a magnet, a mechanical holding mechanism, or a mechanism for holding the head portion of the rivet until the time of joining by vacuuming or the like. Examples of a material of the electrode A include chromium copper, alumina-dispersed copper, and chromium zirconium copper, having excellent conductivity. The pair of electrodes A may have different shapes and materials.

Examples of a power source of a welding machine include a single-phase AC inverter, a DC inverter, and an AC inverter. Examples of a gun type include a stationary type, a C type, and an X type. A force applied to the rivet by the electrode is, for example, 150 kgf to 1000 kgf. The force is preferably 250 kgf to 600 kgf. In order to obtain a good joint portion without cracks, it is desirable to increase the force as the shaft diameter of the rivet is larger. A setting value of the force may be a constant value, but the force may be changed during energization as necessary. A force-applying-direction of the rivet by the electrode is desirably an angle of 10° or less with respect to a direction in which the axis of the rivet extends from a viewpoint of obtaining a good joint portion. The angle formed by the force-applying-direction and the axial direction of the rivet is more desirably 4° or less.

Energization time is, for example, 0.15 seconds to two seconds. The energization time is preferably 0.2 seconds to one second. The number of times of energization may be one (so-called single energization), but two-stage energization or three-stage multistage energization may be performed as necessary. In addition, pulse energization, upslope energization for gradually increasing a current, or downslope energization for gradually decreasing a current may be used. In addition, a high current may be caused to flow in the first half of the energization to rapidly heat the rivet, and the current may be lowered in the latter half to deform the rivet. In addition, when the shaft diameter of the rivet is large, it is desirable to uniformly heat the rivet in the first half of the energization by causing a current value lower than that of the latter half of the energization to flow longer than the latter half of the energization, and further to deform the rivet in the latter half of the energization by increasing the current value and energizing the rivet. On the other hand, as described above, the rivet 12 may be heated by a means other than resistance heat generation. In this case, the means for applying force to the rivet 12 and riveting the rivet 12 is not limited to the pair of electrodes A. By combining the energization conditions with cooling conditions described later, it is easy to obtain a hardness distribution satisfying Equations 1 and 2.

The force is applied to the softened rivet 12 to deform a distal end of the shaft portion 121, and then the rivet 12 is cooled. As a result, the plurality of sheet members 11 is crimped by the rivet 12 to be joined to each other. Specifically, the plurality of sheet members 11 are crimped by the head portion 122 of the rivet 12 and the crushed distal end (that is, the deformed portion 123) of the shaft portion 121 of the rivet 12. Furthermore, by cooling the rivet 12, austenite generated in the metallographic structure of the rivet 12 when the rivet 12 is heated is subjected to martensitic transformation. As a result, a quenched portion is formed at a center of the shaft portion 121, and the Vickers hardness (that is, the Vickers hardness HJ of the shaft portion 121) of a portion of the rivet 12 after cooling at a center in an axial direction and at a center in a radial direction can be enhanced.

By heating and cooling the rivet 12 as described above, for example, the Vickers hardness HJ (HV) of the shaft portion 121 of the rivet 12 after cooling may be 310 or more and 590 or less. By setting the Vickers hardness HJ of the shaft portion 121 to 310 or more, the above-described Equation 1 is easily satisfied. On the other hand, by setting the Vickers hardness HJ of the shaft portion 121 to 590 or less, embrittlement of the shaft portion 121 can be avoided, and the TSS of the riveted joint 1 can be further improved. The Vickers hardness HJ of the shaft portion 121 may be 320 or more, 350 or more, or 400 or more. The Vickers hardness HJ of the shaft portion 121 may be 570 or less, 550 or less, or 530 or less.

The Vickers hardness HA (HV) of the deformed portion 123 of the rivet 12 after cooling may be 310 or more and 600 or less. By setting the Vickers hardness HA of the deformed portion 123 to 310 or more, the above-described Equation 2 is easily satisfied. On the other hand, by setting the Vickers hardness HA of the deformed portion 123 to 600 or less, embrittlement of the deformed portion 123 can be avoided, and the TSS of the riveted joint 1 can be further improved. The Vickers hardness HA of the deformed portion 123 may be 320 or more, 350 or more, or 400 or more. The Vickers hardness HA of the deformed portion 123 may be 580 or less, 550 or less, or 530 or less.

The cooling conditions of the rivet 12 are not particularly limited, but for example, a cooling rate of the rivet 12 at 800 to 500° C. may be defined as 50° C./sec or more, more preferably 100° C./sec or more, and optimally 150° C./sec or more. This makes it easy to cause martensitic transformation at a center of the shaft portion 121 of the rivet 12 and to obtain a hardness distribution satisfying Equations 1 and 2.

In order to set the cooling conditions of the rivet 12 in the above range, the rivet 12 is desirably cooled in an accelerated manner. For example, the rivet 12 can be cooled in an accelerated manner by extending hold time of the electrode A. The hold time is a time from when a current for joining is finished to when the electrode starts to be opened. A cooling medium flows inside the electrode A. After energization, the rivet 12 can be cooled in an accelerated manner by bringing the electrode A into contact with the rivet 12. By cooling the rivet 12 in an accelerated manner, the rivet 12 is quenched, and the joining strength of the joint can be further enhanced. However, when the time (hold time) for holding a contact state between the electrode A and the rivet 12 for cooling the rivet 12 in an accelerated manner is too long, productivity is lowered. Therefore, the hold time is desirably three seconds or less after the energization is completed. The hold time is more desirably 0.01 seconds or more and 1.00 seconds or less. The hold time is optimally 0.10 seconds or more and 0.80 seconds or less.

In the method for manufacturing a riveted joint according to the present embodiment, another joining means may be used in combination. By combining two or more different types of joining means, the joining strength of the riveted joint can be further enhanced.

For example, the rivet joining method according to the present embodiment may further include joining the plurality of sheet members 11 by one or more welding methods selected from the group consisting of spot welding, laser welding, and arc welding (for example, MAG welding, MIG welding, $CO_2$ welding, or plasma welding). Welding may be performed before or after rivet joining. Rivet joining is desirably performed after welding from a viewpoint of improving component assembly accuracy. When spot welding is used as welding, it is only required to perform rivet joining after spot welding. Alternatively, after spot welding, rivet joining may be performed, and then spot welding may be performed.

Figure 4:
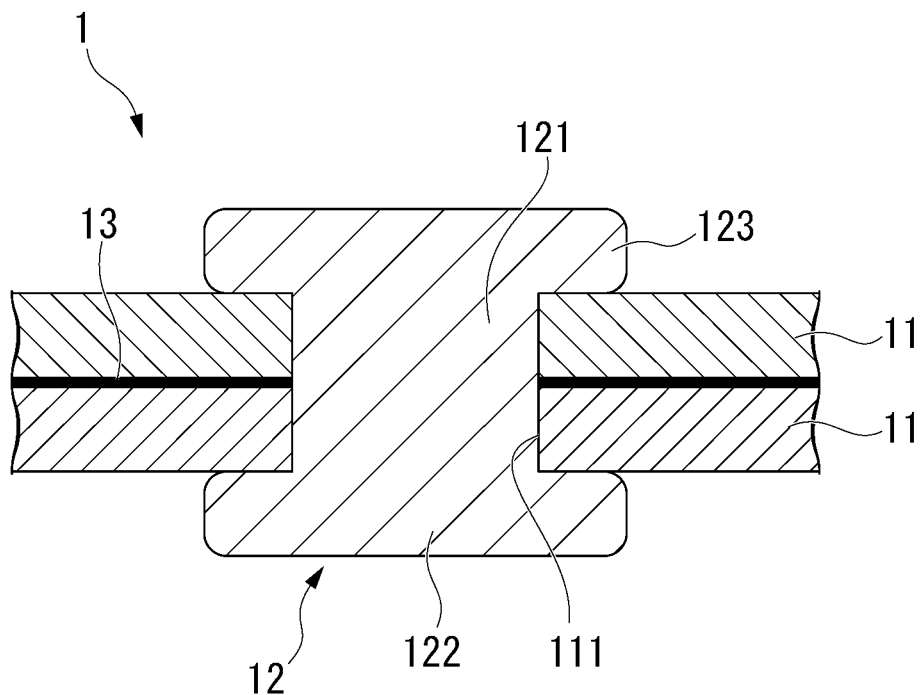
FIG. 4 is a cross-sectional view illustrating a riveted joint further having an adhesive disposed around a through-hole.

In addition, the rivet joining method according to the present embodiment may further include applying an adhesive 13 at least to surroundings of the through-holes 111 of the plurality of sheet members 11, and then overlaying the plurality of sheet members 11. As a result, the sheet members 11 are bonded to each other as illustrated in FIG. 4. The thickness of the adhesive is not particularly limited, but may be 0.03 mm or more and 1.5 mm or less. When the adhesive is too thin, adhesive failure occurs, and when the adhesive is too thick, adhesive strength decreases. The adhesive 13 needs to be applied before the plurality of sheet members 11 are overlaid and the rivet 12 is caused to pass through the sheet members 11. In a case of a thermosetting adhesive, the adhesive 13 may be cured by heating for paint baking in an electrodeposition coating line after rivet joining. In a case of a reaction curing type adhesive, the adhesive 13 is cured as time elapses after rivet joining. Note that, in spot welding of the sheet member 11, it may be necessary to separate an application portion of the adhesive 13 from a spot-welded portion in order to prevent explosion. However, in the rivet joining method according to the present embodiment, since explosion does not occur, there is an advantage that the application portion of the adhesive 13 is not limited. Use of the rivet 12 and the adhesive 13 in combination offers an advantage that rigidity of the joining joint can be further improved. In addition, use of the rivet 12 and the adhesive 13 in combination makes it possible to prevent contact corrosion of an overlaid surface in joining dissimilar metals or joining metal and CFRP. In addition to the adhesive 13, a sealer may be applied between the sheet members 11. The sealer enhances water resistance and corrosion resistance of the riveted joint 1. Furthermore, in the case of joining dissimilar metals or in the case of joining a metal and CFRP, at least one metal sheet may be subjected to chemical conversion treatment and coating before rivet joining. As a result, contact corrosion between dissimilar materials can be further strongly suppressed, and corrosion resistance can be enhanced.

Figure 6A:
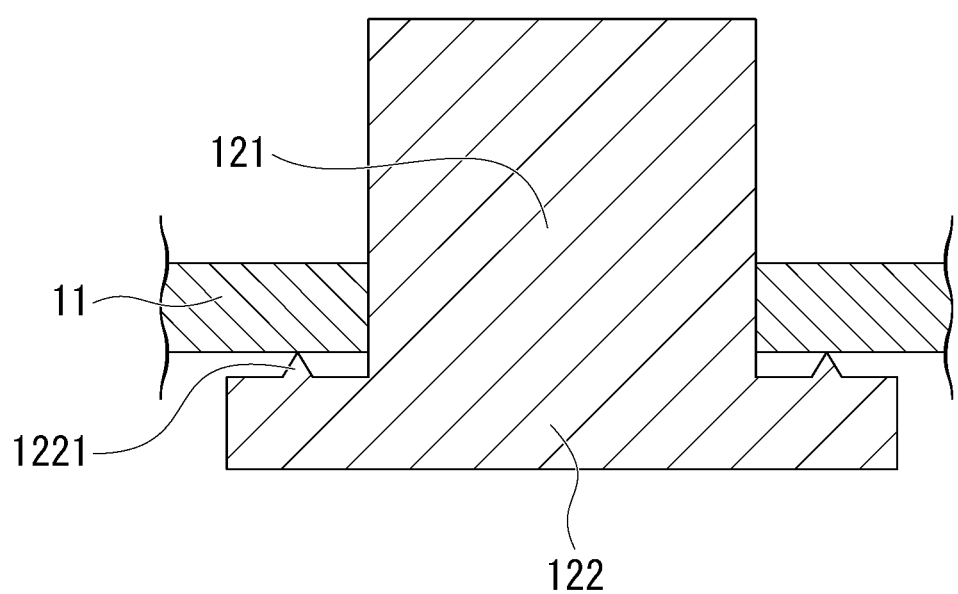
FIG. 6A is a schematic cross-sectional view of a sheet member and a rivet immediately before projection welding.
Figure 6B:
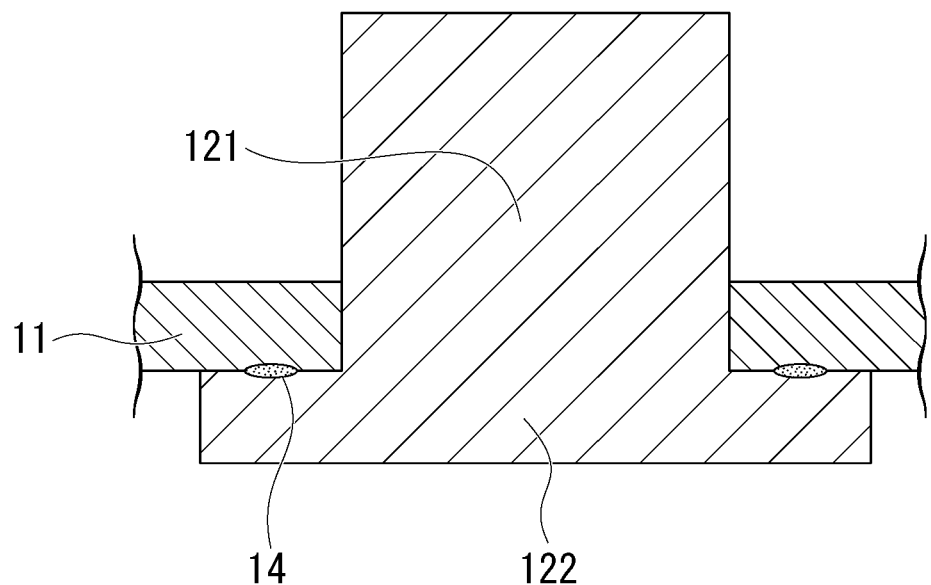
FIG. 6B is a schematic cross-sectional view of a sheet member and a rivet after projection welding is completed.

As illustrated in FIGS. 6A and 6B, the method for manufacturing a riveted joint may further include projection-welding the head portion 122 of the rivet 12 and the sheet member 11 adjacent to the head portion 122. The riveted joint 1 thus obtained has a projection weld 14 that joins the head portion 122 and the sheet member 11. The projection weld 14 exerts an effect of further dispersing stress when tensile shear stress is applied to the riveted joint 1, thereby further improving the TSS of the riveted joint 1.

Note that projection welding may be performed before or after the sheet members 11 are overlaid. For example, as illustrated in FIGS. 6A and 6B, first, the shaft portion 121 of the rivet 12 may be caused to pass through the through-hole 111 of one of the sheet members 11, then the head portion 122 of the rivet 12 and the sheet member 11 may be projection-welded, and the shaft portion 121 of the rivet 12 may be caused to pass through the through-hole 111 of the remaining sheet member 11. In this case, the sheet members 11 are overlaid after projection welding. As a result, the shaft portion 121 can be caused to pass through the through-holes 111 of the plurality of overlaid sheet members 11. On the other hand, the plurality of sheet members 11 may be overlaid first, next, the shaft portion 121 may be caused to pass through the through-holes 111 of the plurality of sheet members 11, and the head portion 122 of the rivet 12 and the sheet members 11 may be projection-welded. In this case, projection welding is performed after the sheet members 11 are overlaid. A timing at which projection welding is performed can be appropriately selected according to an apparatus for manufacturing the riveted joint 1.

Conditions for projection welding are not particularly limited, but for example, in the rivet 12 after cooling, projection welding is preferably performed such that the Vickers hardness HP (HV) of the projection weld 14 and the Vickers hardness HB (HV) of the head portion 122 satisfy the following Equation 4.

$$1.4 \times HB \leq HP \leq 3.2 \times HB. \qquad \text{Equation 4}$$

Figure 7:
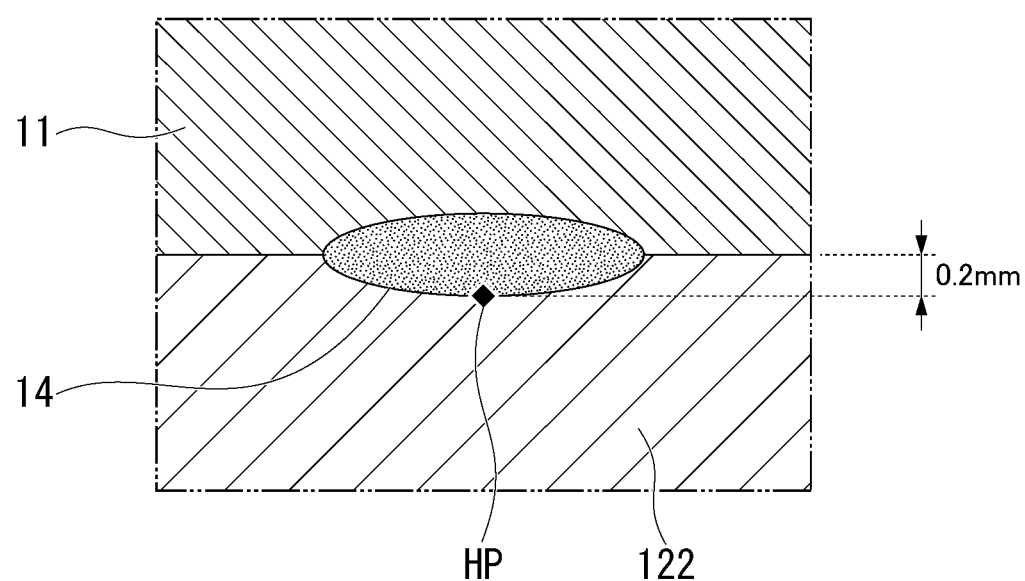
FIG. 7 is an enlarged cross-sectional view of a projection weld.

Here, as illustrated in FIG. 7, the HP is the Vickers hardness of the projection weld 14 measured at a position 0.2 mm away from a contact surface between the head portion 122 and the sheet member 11 toward the head portion 122. Note that the projection weld 14 may be made of a weld metal or may be made of a solid phase joining surface. In any case, it is only required to measure the Vickers hardness HP of the projection weld 14 at the portion described above.

By setting the Vickers hardness HP of the projection weld 14 to 1.4×HB or more, the head portion 122 and the sheet member 11 are less likely to be separated from each other when tensile shear stress is applied to the riveted joint 1. As a result, a stress relaxation effect of the projection weld 14 can be further enhanced. On the other hand, by setting the Vickers hardness HP of the projection weld 14 to 3.2×HB or less, cold cracking of the projection weld 14 can be suppressed, and a stress relaxation effect of the projection weld 14 can be further enhanced. Note that when the rivet 12 and the sheet member 11 are projection-welded, as illustrated in FIG. 6A, a projection 1221 is preferably formed on a bearing surface of the head portion 122 of the rivet 12 before projection welding. The bearing surface is a surface of the head portion 122 in contact with the sheet member 11.

Next, a riveted joint according to another embodiment of the present invention will be described. As illustrated in FIG. 1D, a riveted joint 1 according to the present embodiment includes: a plurality of overlaid sheet members 11 each having a through-hole 111; and a rivet 12 having a shaft portion 121, and a head portion 122 and a deformed portion 123 formed at both ends of the shaft portion 121, respectively, the shaft portion 121 passing through the through-holes 111 and crimping the plurality of sheet members 11. Here, a Vickers hardness HB (HV) of the head portion 122 of the rivet 12 satisfies 130≤HB≤330, and a Vickers hardness HA (HV) of the deformed portion 123 of the rivet 12, a thickness TA (mm) of the deformed portion 123, a Vickers hardness HJ (HV) of a portion of the shaft portion 121 at a center in an axial direction and at a center in a radial direction, a diameter DJ (mm) of the shaft portion 121, a Vickers hardness HB (HV) of the head portion 122, and a thickness TB (mm) of the head portion 122 satisfy the following Equations A and B:

$$HJ \times DJ \geq 4.7 \times HB \times TB \qquad \text{Equation A}$$

$$HA \times TA \geq 1.3 \times HB \times TB. \qquad \text{Equation B}$$

A constitution of the plurality of sheet members 11 is not particularly limited. In addition, a constitution of the through-hole 111 which is formed in the sheet member 11 and into which the rivet 12 is inserted is not particularly limited. These specific examples are as described in detail in the description of the method for manufacturing a riveted joint according to the present embodiment.

The diameters of the through-holes 111 (equivalent circle diameters when the through-holes 111 are not circular) in the plurality of sheet members 11 may be the same or different. By providing a difference between the sizes of the through-holes 111, a stress relaxation effect and improvement in efficiency of work of causing the rivet 12 to pass through the through-holes 111 can be expected. The degree of difference between the diameters of the through-boles 111 is not particularly limited, but for example, the difference between the diameters of the through-holes 111 in the adjacent sheet members 11 is preferably in a range of 0.3 mm to 3 mm.

The rivet 12 is a member whose shaft portion 121 passes through the through-hole 111 and crimps the plurality of sheet members 11. Therefore, the rivet 12 has the head portion 122 and the deformed portion 123 formed at both ends of the shaft portion 121, respectively. The shaft portion 121 is inserted into the through-holes 111 of the plurality of sheet members 11, and the head portion 122 and the deformed portion 123 pinch the plurality of sheet members 11, whereby the shaft portion 121 crimps and joins the plurality of sheet members 11 to each other. The deformed portion 123 is formed by crushing a distal end of the shaft portion 121. Note that the head portion 122 and the deformed portion 123 can be easily discriminated from each other, and can also be discriminated from each other, for example, from a metal flow and the degree of oxidation of a surface. Alternatively, a portion having a higher Vickers hardness can be regarded as the deformed portion 123.

Specific examples of the constitution (shape, material, surface treatment, and the like) of the rivet 12 are as described in detail in the description of the method for manufacturing a riveted joint according to the present embodiment. For example, the carbon content of the rivet 12 is preferably 0.08 to 0.40 mass %. The carbon content of the rivet 12 may be 0.10 mass % or more, 0.15 mass % or more, or 0.17 mass % or more. The carbon content of the rivet 12 may be 0.350 mass % or less, 0.30 mass % or less, or 0.25 mass % or less. The C content, the Mn content, and the B content of the rivet 12 in unit mass % may satisfy 0.16≤C+(1/30) Mn+5B≤0.50. The C+(1/30) Mn+5B may be 0.18 or more, 0.20 or more, or 0.25 or more. The C+(1/30) Mn+5B may be 0.48 or less, 0.45 or less, or 0.35 or less.

In the rivet 12, the Vickers hardness HA of the deformed portion 123, the thickness TA of the deformed portion 123, the Vickers hardness HJ of the shaft portion 121, the diameter DJ of the shaft portion 121, the Vickers hardness HB of the head portion 122, and the thickness TB of the head portion 122 satisfy the following Equations A and B.

$$HJ \times DJ \geq 4.7 \times HB \times TB \quad \text{Equation A}$$

$$HA \times TA \geq 1.3 \times HB \times TB. \quad \text{Equation B}$$

A method for measuring the numerical values included in these Equations is the same as the method described in the method for manufacturing a riveted joint. According to experimental results of the present inventors, it has been confirmed that the head portion 122 is most likely to be fractured in the rivet 12 after cooling by controlling the shapes and hardness of the shaft portion 121, the head portion 122, and the deformed portion so as to satisfy Equations A and B.

The lower limit value of HJ×DJ may be 5.3×HB×TB. That is, the Vickers hardness HJ (HV) of a portion of the shaft portion 121 of the rivet 12 after cooling at a center in an axial direction and at a center in a radial direction, the diameter DJ (mm) of the shaft portion 121, the Vickers hardness HB (HV) of the head portion 122, and the thickness TB (mm) of the head portion 122 may satisfy the following Equation C:

$$HJ \times DJ \geq 5.3 \times HB \times TB. \quad \text{Equation C}$$

When the above Equation C is satisfied, fracture in the shaft portion 121 is further suppressed. The lower limit value of HJ×DJ may be 5.0×HB×TB, 5.5×HB×TB, or 5.8×HB×TB.

The lower limit value of HA×TA may be 1.5×HB×TB. As a result, fracture in the shaft portion 121 is further suppressed. The lower limit value of HA×TA may be 1.8×HB×TB, 2.0×HB×TB, or 2.5×HB×TB.

In the rivet 12, the Vickers hardness HB of the head portion 122 needs to satisfy 130≤HB≤330. When the Vickers hardness HB of the head portion 122 is more than 330, a fracture starting point of the rivet 12 may be outside the head portion 122. On the other hand, when the Vickers hardness HB of the head portion 122 is less than 130, the TSS of the riveted joint 1 rather decreases. For the above reasons, the Vickers hardness HB of the head portion 122 is 130 or more and 330 or less. The Vickers hardness HB of the head portion 122 may be 135 or more, 150 or more, or 180 or more. The Vickers hardness HB of the head portion 122 may be 300 or less, 280 or less, or 250 or less.

The interior of the rivet 12 may be quenched. As a result, in the rivet 12, the Vickers hardness of a portion at a center in an axial direction and at a center in a radial direction, that is, the Vickers hardness HJ (HV) of the shaft portion 121 may be 310 or more and 590 or less. By setting the Vickers hardness HJ of the shaft portion 121 to 310 or more, the above-described Equation A is easily satisfied. On the other hand, by setting the Vickers hardness HJ of the shaft portion 121 to 590 or less, embrittlement of the shaft portion 121 can be avoided, and the TSS of the riveted joint 1 can be further improved. The Vickers hardness HJ of the shaft portion 121 may be 320 or more, 350 or more, or 400 or more. The Vickers hardness HJ of the shaft portion 121 may be 570 or less, 550 or less, or 530 or less.

The Vickers hardness HA (HV) of the deformed portion 123 of the rivet 12 may be 310 or more and 600 or less. By setting the Vickers hardness HA of the deformed portion 123 to 310 or more, the above-described Equation B is easily satisfied. On the other hand, by setting the Vickers hardness HA of the deformed portion 123 to 600 or less, embrittlement of the deformed portion 123 can be avoided, and the TSS of the riveted joint 1 can be further improved. The Vickers hardness HA of the deformed portion 123 may be 320 or more, 350 or more, or 400 or more. The Vickers hardness HA of the deformed portion 123 may be 580 or less, 550 or less, or 530 or less.

One or more of the plurality of sheet members 11 may be a steel sheet. In particular, when the sheet member 11 and the rivet 12 are made of high strength steel (for example, steel having a tensile strength of 980 MPa or more), the strength of the riveted joint 1 can be dramatically enhanced. Note that, unlike a spot weld, the rivet 12 does not embrittle the steel material, and thus does not decrease the CTS. In addition, unlike a normal rivet, the rivet 12 of the riveted joint according to the present embodiment has a high TSS, and thus is suitable for joining high strength steel sheets.

The riveted joint 1 may further have an adhesive 13 disposed at least around the through-holes 111 of the plurality of sheet members 11. The riveted joint 1 may further have one or more welds selected from the group consisting of a spot weld, a laser weld, and an arc weld. As described above, by combining a plurality of joining means, the joint strength of the riveted joint 1 can be further enhanced. The riveted joint 1 may further have a sealer disposed between the plurality of sheet members 11. The sealer enhances water resistance and corrosion resistance of the riveted joint 1. As the adhesion layer, a resin adhesive tape such as an ionomer may be used. The sealer may be applied so as to cover the head portion and/or the deformed portion of the rivet. This makes it possible to prevent water from entering through a gap between the bead portion and/or the deformed portion of the rivet and metal or CFRP.

Figure 5:
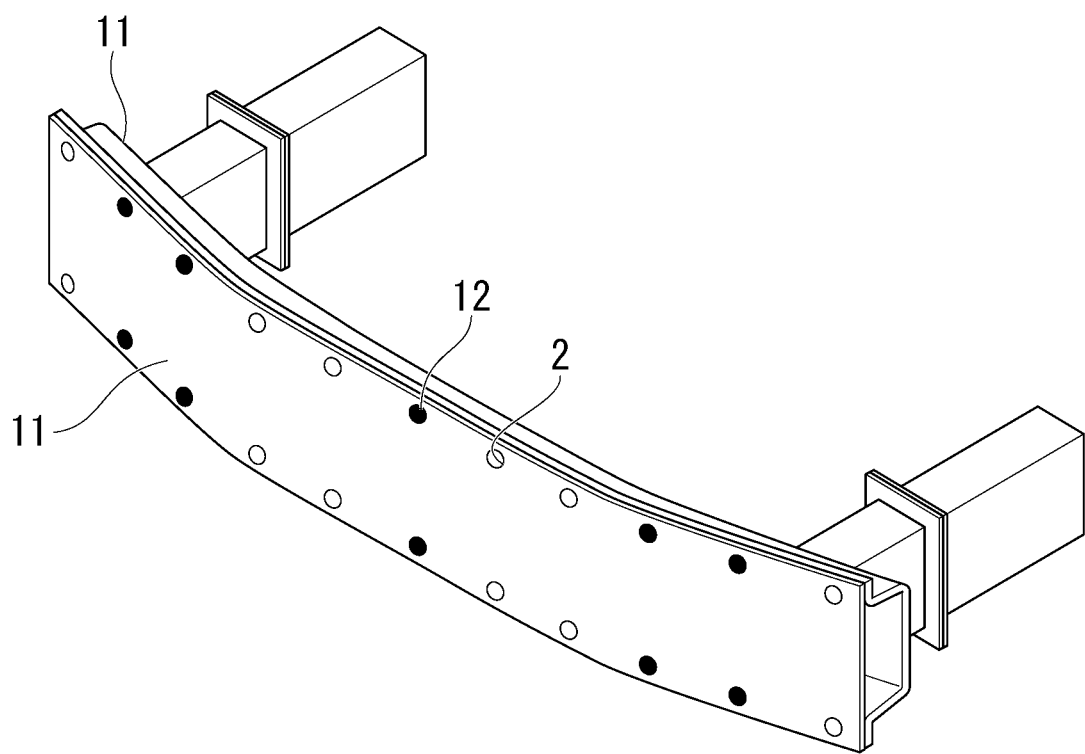
FIG. 5 is a perspective view of a bumper using a riveted joint and another joining means in combination.

FIG. 5 illustrates an example (bumper) of the riveted joint 1 in which the rivet 12 and another joining means are used in combination. As illustrated in FIG. 5, joining using the rivet 12 (black circle part in FIG. 5) according to the present embodiment may be performed in a portion where stress applied at the time of collision is expected to be high, and another joining means (for example, a spot weld 2 formed by inexpensive spot welding) (white circle part in FIG. 5) may be adopted in the other portions.

Figure 8:
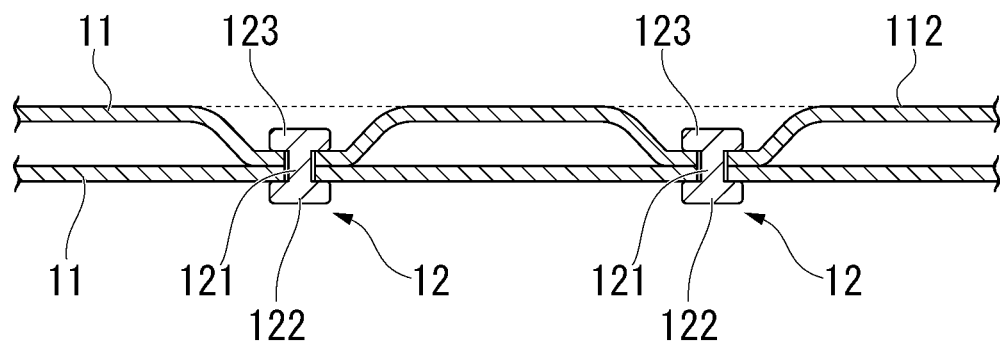
FIG. 8 is a cross-sectional view illustrating an example of a means for preventing interference between a rivet and another component.
Figure 9:
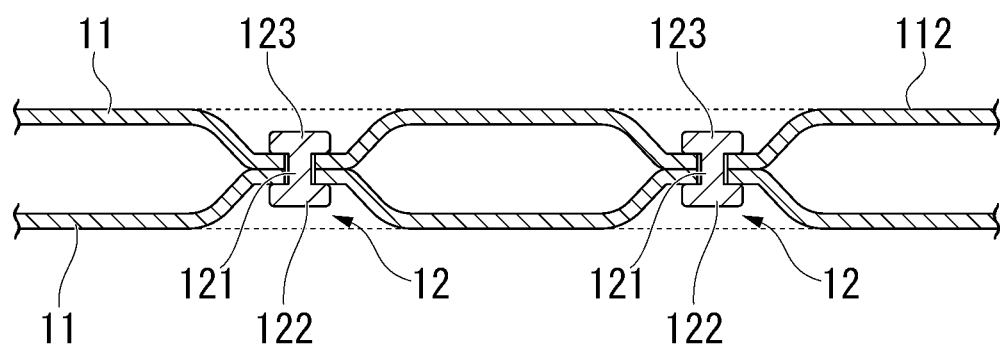
FIG. 9 is a cross-sectional view illustrating an example of a means for preventing interference between a rivet and another component.
Figure 10:
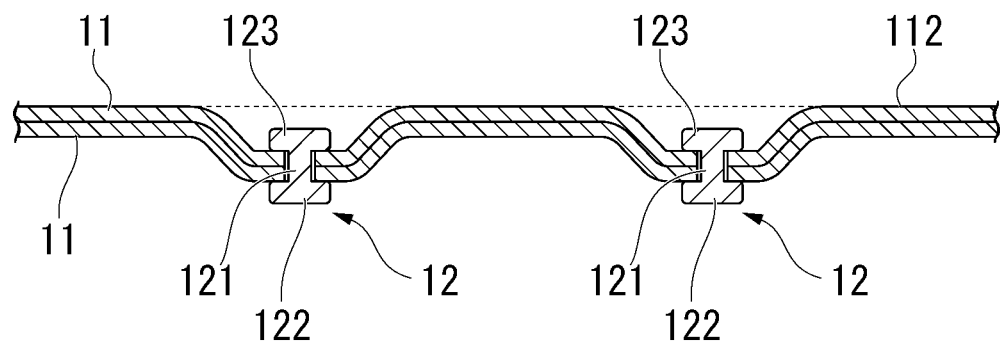
FIG. 10 is a cross-sectional view illustrating an example of a means for preventing interference between a rivet and another component.

In the riveted joint 1 according to the present embodiment, the rivet 12 has the head portion 122 and the deformed portion 123 formed at both ends of the shaft portion 121, respectively. Here, as illustrated in FIGS. 8 to 10, in a cross-sectional view parallel to an axis of the shaft portion 121 of the rivet 12, a top surface of the head portion 122 and/or the deformed portion 123 may be closer to the shaft portion 121 than a position 0.6 mm away from a surface of the sheet member 11 in the vicinity of the rivet 12 toward a side away from the shaft portion 121 in a direction along the axis of the shaft portion 121. Here, the surface (outer surface) of the sheet member 11 means a surface of the sheet member 11 not in contact with another sheet member. As a result, it is possible to suppress protrusion of the head portion 122 and/or the deformed portion 123 from the sheet member 11 (alternatively, the height of a protrusion portion is suppressed to 0.6 mm or less) and to suppress interference between the head portion 122 and/or the deformed portion 123 and other components.

In the examples of FIGS. 8 and 10, the top surface of the deformed portion 123 of the rivet 12 is closer to the shaft portion 121 than a surface 112 (outer surface) of the sheet member in the vicinity of the rivet 12. In the example of FIG. 9, the top surfaces of both the head portion 122 and the deformed portion 123 of the rivet 12 are closer to the shaft portion 121 than the surface 112 (outer surface) of each of the sheet members in the vicinity of the rivet 12. Here, the surface 112 (outer surface) of the sheet member means a surface of each of the sheet members not in contact with another sheet member. Note that, in FIGS. 8 to 10, the top surface of the head portion 122 and/or the deformed portion 123 is closer to the shaft portion 121 than the surface 112 (outer surface) of a sheet member in the vicinity of the rivet 12, and the top surface of the head portion 122 and/or the deformed portion 123 may protrude from the surface 112 of the sheet member by 0.6 mm at a maximum. That is, in FIGS. 8 to 10, even when the top surface of the head portion 122 and/or the deformed portion 123 protrudes from a dotted line by 0.6 mm, an effect of suppressing interference with other components can be obtained.

By press-forming the sheet members 11 before or after joining the sheet members 11 by the above-described method, the top surface of the head portion 122 and/or the deformed portion 123 may be closer to the shaft portion 121 than a position 0.6 mm away from the surface 112 of the sheet member 11 in the vicinity of the rivet 12 in a direction along the axis of the shaft portion 121. In the example of FIG. 8, one of the two sheet members 11 disposed on the deformed portion 123 side is deformed to the deformed portion 123 side in the vicinity of the rivet 12. In the example of FIG. 9, one of the two sheet members on the head portion 122 side is deformed to the head portion 122 side in the vicinity of the rivet 12, and one of the two sheet members on the deformed portion 123 side is deformed to the deformed portion 123 side in the vicinity of the rivet 12. In the example of FIG. 10, one of the two sheet members 11 on the deformed portion 123 side is deformed to the deformed portion 123 side in the vicinity of the rivet 12, and one of the two sheet members 11 on the head portion 122 side is deformed corresponding to the other sheet member 11 in the vicinity of the rivet 12. Note that broken lines in FIGS. 8 to 10 indicate surfaces matching the surface 112 of the sheet member.

The riveted joint 1 may further have a projection weld 14 joining the head portion 122 of the rivet 12 and the sheet member 11 adjacent to the head portion 122. The projection weld 14 exerts an effect of further dispersing stress when tensile shear stress is applied to the riveted joint 1, thereby further improving the TSS of the riveted joint 1.

The Vickers hardness HP (HV) of the projection weld 14 and the Vickers hardness HB (HV) of the head portion 122 of the rivet 12 may satisfy the following Equation D:

$$1.4 \times HB \leq HP \leq 3.2 \times HB. \qquad \text{Equation D}$$

Here, the HP is the Vickers hardness of the projection weld 14 measured at a position 0.2 mm away from a contact surface between the head portion 122 and the sheet member 11 toward the head portion 122. Note that the projection weld 14 may be made of a weld metal or may be made of a solid phase joining surface. In any case, it is only required to measure the Vickers hardness HP of the projection weld 14 at the portion described above. The Vickers hardness HP is measured under a load of 0.5 kgf.

By setting the Vickers hardness HP of the projection weld 14 to 1.4×HB or more, the head portion 122 and the sheet member 11 are less likely to be separated from each other when tensile shear stress is applied to the riveted joint 1. As a result, a stress relaxation effect of the projection weld 14 can be further enhanced. On the other hand, by setting the Vickers hardness HP of the projection weld 14 to 3.2×HB or less, cracking of the projection weld 14 can be suppressed, and a stress relaxation effect of the projection weld 14 can be further enhanced.

Figure 11:
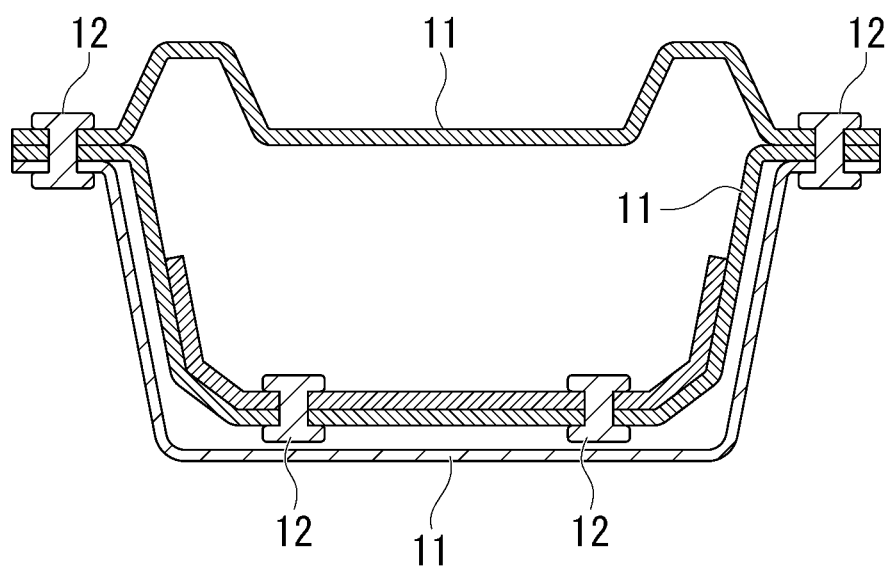
FIG. 11 is a cross-sectional view of a B-pillar which is an example of a vehicle component according to the present embodiment.
Figure 12:
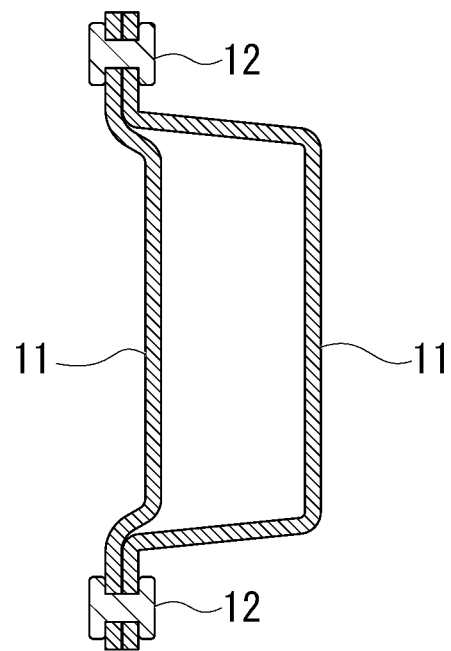
FIG. 12 is a cross-sectional view of a bumper which is an example of a vehicle component according to the present embodiment.

A vehicle component according to another aspect of the present invention includes the riveted joint according to the present embodiment. As a result, the vehicle component according to the present embodiment has a high joining strength. Examples of the vehicle component according to the present embodiment include a bumper and a B-pillar which are important members for ensuring collision safety. FIG. 11 illustrates a cross-sectional view of a B-pillar which is an example of the vehicle component according to the present embodiment. FIG. 12 illustrates a cross-sectional view of a bumper which is an example of the vehicle component according to the present embodiment. In addition, an A-pillar, a side sill, a floor member, a frontside member, a rear side member, a front suspension tower, a tunnel reinforcement, a dash panel, a torque box, a seat frame, a seat rail, a frame of a battery case, or a coupling portion between these pillars (a coupling portion between a B pillar and a side sill, a coupling portion between a B pillar and a roof rail, or a coupling portion between a roof cross member and a roof rail) may be used as the vehicle component according to the present embodiment.

EXAMPLES

Each of various steel rivets having different components, shapes, and processing treatments was inserted into through-holes of two hot-stamped high strength steel sheets having a tensile strength of 2400 MPa. Subsequently, force-applying and energization is performed to these rivets using a spot-welding machine to prepare riveted joints. For some rivets, projection welding for joining a head portion of each of the rivets and a steel sheet was performed.

The steel sheet had a sheet thickness of 1.6 mm. Components of the steel sheet were 0.45C-0.5Mn—, Si, Cr, Ti, Nb, and B. A material of an electrode used for riveting was a Cr—Cu alloy. Rivet joining conditions and projection welding conditions were as follows.

Rivet joining conditions
  Force: 400 kgf
  Energization time: adjusted in a range of 0.30 seconds to 0.50 seconds
  Current value: adjusted in a range of 5 kA to 10 kA
  Hold time: 0.5 seconds
Projection welding conditions
  Force: 400 kgf
  Energization time: 0.1 seconds
  Current value: adjusted in a range of 10 kA to 13 kA In the various riveted joints obtained by the above-described means, the Vickers hardness HA of a deformed portion, the thickness TA of the deformed portion, the Vickers hardness HJ of a shaft portion, the diameter DJ of the shaft, the Vickers hardness HB of a head portion, and the thickness TB of the head portion were measured by the above-described means, and are described in Table 1. As for the riveted joint subjected to projection welding, the Vickers hardness HP of a projection weld was also measured by the above-described means and described in Table 1. Determination results as to whether or not the above-described values satisfy the following Equations are described in Table 2.

$$HJ \times DJ \geq 4.7 \times HB \times TB \quad \text{Equation 1 (Equation A)}$$

$$HA \times TA \geq 1.3 \times HB \times TB \quad \text{Equation 2 (Equation B)}$$

$$1.4 \times HB \leq HP \leq 3.2 \times HB \quad \text{Equation 4 (Equation D)}$$

The tensile shear strength (TSS) and the like of the various riveted joints obtained by the above-described means were evaluated by a tensile shear test. The tensile shear test was performed in accordance with JIS Z 3136: 1999 "TEST PIECE DIMENSIONS AND TEST METHOD FOR SHEAR TEST OF RESISTANCE SPOT AND PROJECTION WELD JOINT". A riveted joint satisfying the following two conditions was determined as a riveted joint having a stably enhanced TSS.

(Condition 1) The TSS is more than 1.3×DJ×TB.
(Condition 2) A fractured portion formed by the tensile shear test is in a head portion of a rivet.

Note that whether the fractured portion was in the head portion or the deformed portion of the rivet was confirmed by observing the fractured portion of the rivet after the test, A riveted joint satisfying Condition 1 can be regarded as having high resistance to tensile shear stress. Note that since the TSS is largely affected by the shape of the rivet, a pass/fail reference value was set as a function of the diameter DJ of the shaft portion 121 and the thickness TB of the head portion 122 in determining whether or not the TSS is enhanced.

In addition, it can be considered that the tensile shear stress of a riveted joint satisfying Condition 2 is stably enhanced. In a riveted joint in which a fractured portion is formed in a deformed portion of a rivet, it is estimated that the TSS varies when the tensile shear test is performed many times, and therefore, even when the TSS satisfies the above condition 1, it is not considered that the TSS is stably enhanced.

TABLE 1

| | HA (HV) | HJ (HV) | HB (HV) | HP (HV) | TA (mm) | DJ (mm) | TB (mm) |
|---|---|---|---|---|---|---|---|
| 1 | 435 | 445 | 205 | — | 2.0 | 3.8 | 1.2 |
| 2 | 441 | 438 | 212 | — | 2.2 | 5.9 | 2.0 |
| 3 | 425 | 420 | 195 | — | 3.1 | 8.2 | 2.8 |
| 4 | 592 | 585 | 301 | — | 2.2 | 6.0 | 2.0 |
| 5 | 521 | 531 | 278 | — | 2.2 | 6.0 | 2.0 |
| 6 | 385 | 372 | 172 | — | 2.2 | 6.0 | 2.0 |
| 7 | 318 | 319 | 156 | — | 2.2 | 6.0 | 2.0 |
| 8 | 430 | 420 | 135 | — | 2.3 | 5.9 | 1.9 |
| 9 | 527 | 537 | 321 | — | 2.2 | 6.2 | 1.9 |
| 10 | 435 | 448 | 198 | — | 2.6 | 6.0 | 2.0 |
| 11 | 452 | 438 | 186 | — | 1.2 | 6.0 | 2.0 |
| 12 | 453 | 433 | 149 | 471 | 2.2 | 6.0 | 2.0 |
| 13 | 378 | 377 | 260 | 378 | 2.5 | 6.9 | 1.8 |
| 14 | 515 | 550 | 355 | — | 1.6 | 6.6 | 1.9 |
| 15 | 142 | 137 | 105 | — | 2.2 | 6.0 | 2.0 |
| 16 | 354 | 365 | 240 | — | 1.2 | 7.0 | 2.0 |
| 17 | 320 | 320 | 97 | — | 2.2 | 5.9 | 2.0 |
| 18 | 439 | 433 | 224 | 458 | 2.2 | 5.0 | 1.8 |
| 19 | 153 | 158 | 131 | 155 | 2.4 | 8.0 | 1.8 |
| 20 | 618 | 589 | 230 | — | 2.3 | 6.0 | 2.0 |

TABLE 2

| | Equation 1 | Equation 2 | Presence of absence of projection weld | Equation 3 | 1.3 × D J × TB | TSS (kN) | Fracture position in TSS | Notes |
|---|---|---|---|---|---|---|---|---|
| 1 | Satisfied | Satisfied | Absence | — | 5.9 | 9.4 | Head portion | Invention Example |
| 2 | Satisfied | Satisfied | Absence | — | 15.3 | 25.1 | Head portion | Invention Example |
| 3 | Satisfied | Satisfied | Absence | — | 29.8 | 45.0 | Head portion | Invention Example |
| 4 | Satisfied | Satisfied | Absence | — | 15.6 | 36.3 | Head portion | Invention Example |
| 5 | Satisfied | Satisfied | Absence | — | 15.6 | 33.5 | Head portion | Invention Example |
| 6 | Satisfied | Satisfied | Absence | — | 15.6 | 20.7 | Head portion | Invention Example |
| 7 | Satisfied | Satisfied | Absence | — | 15.6 | 18.8 | Head portion | Invention Example |
| 8 | Satisfied | Satisfied | Absence | — | 14.6 | 15.2 | Head portion | Invention Example |
| 9 | Satisfied | Satisfied | Absence | — | 15.3 | 38.0 | Head portion | Invention Example |
| 10 | Satisfied | Satisfied | Absence | — | 15.6 | 23.9 | Head portion | Invention Example |

TABLE 2-continued

| | Equation 1 | Equation 2 | Presence of absence of projection weld | Equation 3 | 1.3 × D J × TB | TSS (kN) | Fracture position in TSS | Notes |
|---|---|---|---|---|---|---|---|---|
| 11 | Satisfied | Satisfied | Absence | — | 15.6 | 22.4 | Head portion | Invention Example |
| 12 | Satisfied | Satisfied | Presence | Satisfied | 15.6 | 23.0 | Head portion | Invention Example |
| 13 | Satisfied | Satisfied | Presence | Satisfied | 16.1 | 36.4 | Head portion | Invention Example |
| 14 | Satisfied | Not satisfied | Absence | — | 16.3 | 19.7 | Deformed portion | Comparative Example |
| 15 | Not satisfied | Satisfied | Absence | — | 15.6 | 7.7 | Shaft portion | Comparative Example |
| 16 | Satisfied | Not satisfied | Absence | — | 18.2 | 17.2 | Deformed portion | Comparative Example |
| 17 | Satisfied | Satisfied | Absence | — | 15.3 | 11.5 | Head portion | Comparative Example |
| 18 | Satisfied | Satisfied | Presence | Satisfied | 11.7 | 24.3 | Head portion | Invention Example |
| 19 | Satisfied | Satisfied | Presence | Satisfied | 18.7 | 21.0 | Head portion | Invention Example |
| 20 | Satisfied | Satisfied | Absence | — | 15.6 | 23.7 | Head portion | Invention Example |

In a riveted joint in which a head portion had a Vickers hardness HB (HV) of 130 to 330 and which satisfied Equations 1 and 2, the TSS was stably enhanced.

On the other hand, in Example 14 in which a head portion had an excessive Vickers hardness HB and which did not satisfy Equation 2, a fractured portion was formed in a deformed portion. Although Example 14 had a high TSS, it is estimated that the TSS varies when a plurality of riveted joints are manufactured under the conditions of Example 14.

In Example 15 in which the Vickers hardness HB of a head portion was insufficient and Equation 1 was not satisfied, a fracture portion was formed in a shaft portion, and the TSS was extremely low.

In Example 16 in which Equation 2 was not satisfied, a fractured portion was formed in a deformed portion, and the TSS was low.

In Example 17 in which the Vickers hardness HB of a head portion was insufficient, the TSS was low. Although the TSS in Example 17 was slightly higher than that in Example 15 because a fractured portion was formed in the head portion, the TSS of Example 17 failed to meet the pass/fail reference because the Vickers hardness HB of the head portion was insufficient.

BRIEF DESCRIPTION OF THE REFERENCE SYMBOLS

1 Riveted joint
11 Sheet member
111 Through-hole
112 Surface of sheet member
12 Rivet
121 Shaft portion
122 Head portion
1221 Projection
123 Deformed portion
13 Adhesive
14 Projection weld
2 Spot weld
A Electrode
HA Vickers hardness of deformed portion 123
TA Thickness of deformed portion 123
HJ Vickers hardness of shaft portion 121
DJ Diameter of shaft portion 121
HB Vickers hardness of head portion 122
TB Thickness of head portion 122

What is claimed is:

1. A method for manufacturing a riveted joint, comprising:

causing a shaft portion of a steel rivet having the shaft portion and a head portion to pass through throughholes of a plurality of overlaid sheet members;

sandwiching the rivet between a pair of electrodes in an axial direction of the rivet;

applying a force to the rivet and energizing the rivet with a pair of the electrodes to form a deformed portion at a distal end of the shaft portion; and cooling the rivet, wherein a Vickers hardness HB (HV) of the head portion of the rivet after cooling satisfies 130≤HB≤330, and in the rivet after cooling, a Vickers hardness HA (HV) of the deformed portion, a thickness TA (mm) of the deformed portion, a Vickers hardness HJ (HV) of a portion of the shaft portion at a center in the axial direction and at a center in a radial direction, a diameter DJ (mm) of the shaft portion, a Vickers hardness HB (HV) of the head portion, and a thickness TB (mm) of the head portion satisfy the following Equations 1 and 2:

$$HJ \times DJ \geq 4.7 \times HB \times TB \qquad \text{Equation 1}$$

$$HA \times TA \geq 1.3 \times HB \times TB. \qquad \text{Equation 2}$$

2. The method for manufacturing a riveted joint according to claim 1, wherein in the rivet after cooling, the Vickers hardness HJ (HV) of the portion of the shaft portion at the center in the axial direction and at the center in the radial direction, the diameter DJ (mm) of the shaft portion, the Vickers hardness HB (HV) of the head portion, and the thickness TB (mm) of the head portion satisfy the following Equation 3:

$$HJ \times DJ \geq 5.3 \times HB \times TB. \qquad \text{Equation 3}$$

3. The method for manufacturing a riveted joint according to claim 1, wherein
the Vickers hardness HA (HV) of the deformed portion of the rivet after cooling satisfies 310≤HA≤600, and
the Vickers hardness HJ (HV) of the portion of the shaft portion of the rivet after cooling at the center in the axial direction and at the center in the radial direction satisfies 310≤HJ≤590.

4. The method for manufacturing a riveted joint according to claim 1, wherein one or more of the plurality of the sheet members is a high strength steel sheet having a tensile strength of 1180 MPa or more.

5. The method for manufacturing a riveted joint according to claim 1, wherein a C content of the rivet is 0.08 to 0.40 mass %.

6. The method for manufacturing a riveted joint according to claim 1, wherein a C content, a Mn content, and a B content of the rivet satisfy 0.16≤C+(1/30) Mn+5B≤0.50.

7. The method for manufacturing a riveted joint according to claim 1, further comprising
projection-welding the head portion of the rivet and the sheet member adjacent to the head portion.

8. The method for manufacturing a riveted joint according to claim 7, wherein in the rivet after cooling, a Vickers hardness HP (HV) of a projection weld formed by the projection welding and the Vickers hardness HB (HV) of the head portion satisfy the following Equation 4:

$$1.4 \times HB \leq HP \leq 3.2 \times HB. \qquad \text{Equation 4}$$

9. A riveted joint comprising:
a plurality of overlaid sheet members each having a through-hole; and
a steel rivet crimping the plurality of sheet members, the steel rivet having a shaft portion, and a head portion and a deformed portion formed at both ends of the shaft portion, respectively, the shaft portion passing through the through-holes, wherein
a Vickers hardness HB (HV) of the head portion of the rivet satisfies 130≤HB≤330, and
a Vickers hardness HA (HV) of the deformed portion of the rivet, a thickness TA (mm) of the deformed portion, a Vickers hardness HJ (HV) of a portion of the shaft portion at a center in an axial direction and at a center in a radial direction, a diameter DJ (mm) of the shaft portion, a Vickers hardness HB (HV) of the head portion, and a thickness TB (mm) of the head portion satisfy the following Equations A and B:

$$HJ \times DJ \geq 4.7 \times HB \times TB \qquad \text{Equation A}$$

$$HA \times TA \geq 1.3 \times HB \times TB. \qquad \text{Equation B}$$

10. The riveted joint according to claim 9, wherein the Vickers hardness HJ (HV) of the portion of the shaft portion of the rivet at the center in the axial direction and at the center in the radial direction, the diameter DJ (mm) of the shaft portion, the Vickers hardness HB (HV) of the head portion, and the thickness TB (mm) of the head portion satisfy the following Equation C:

$$HJ \times DJ \geq 5.3 \times HB \times TB. \qquad \text{Equation C}$$

11. The riveted joint according to claim 9, wherein
the Vickers hardness HA (HV) of the deformed portion of the rivet satisfies 310≤HA≤600, and
the Vickers hardness HJ (HV) of the portion of the shaft portion of the rivet at the center in the axial direction and at the center in the radial direction satisfies 310≤HJ≤590.

12. The riveted joint according to claim 9, wherein one or more of the plurality of the sheet members is a high strength steel sheet having a tensile strength of 1180 MPa or more.

13. The riveted joint according to claim 9, wherein a C content of the rivet is 0.08 to 0.40 mass %.

14. The riveted joint according to claim 9, wherein a C content, a Mn content, and a B content of the rivet satisfy 0.16≤C+(1/30) Mn+5B≤0.50.

15. The riveted joint according to claim 9, further comprising a projection weld that joins the head portion of the rivet and the sheet member adjacent to the head portion.

16. The riveted joint according to claim 15, wherein a Vickers hardness HP (HV) of the projection weld and the Vickers hardness HB (HV) of the head portion of the rivet satisfy the following Equation D:

$$1.4 \times HB \leq HP \leq 3.2 \times HB. \qquad \text{Equation D}$$

17. A vehicle component comprising the riveted joint according to claim 9.

18. The vehicle component according to claim 17, wherein the vehicle component is a bumper or a B-pillar.

* * * * *